US008508781B2

(12) United States Patent
Yaguchi et al.

(10) Patent No.: US 8,508,781 B2
(45) Date of Patent: Aug. 13, 2013

(54) IMAGE FORMING APPARATUS WHICH DETERMINES NECESSITY OF STORING PRINT DATA

(75) Inventors: Minoru Yaguchi, Hachioji (JP); Takeshi Nakajima, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 388 days.

(21) Appl. No.: 12/880,232

(22) Filed: Sep. 13, 2010

(65) Prior Publication Data

US 2011/0069352 A1    Mar. 24, 2011

(30) Foreign Application Priority Data

Sep. 18, 2009 (JP) .................... 2009-216611

(51) Int. Cl.
*G06F 15/00* (2006.01)
*G06K 1/00* (2006.01)
*G06K 15/00* (2006.01)

(52) U.S. Cl.
USPC ........................................ 358/1.16; 358/1.13

(58) Field of Classification Search
None
See application file for complete search history.

(56) References Cited

U.S. PATENT DOCUMENTS

| 2005/0162691 | A1 | 7/2005 | Tsuzuki |
| 2007/0211294 | A1 | 9/2007 | Tsuchitoi |
| 2007/0285703 | A1 | 12/2007 | Ida |
| 2009/0237713 | A1* | 9/2009 | Ebisawa et al. ............. 358/1.15 |
| 2009/0268227 | A1* | 10/2009 | Kaneko ........................ 358/1.14 |

FOREIGN PATENT DOCUMENTS

| CN | 101087348 A | 12/2007 |
| JP | 9-174956 A | 7/1997 |
| JP | 2003-196208 A | 7/2003 |
| JP | 2005-205755 | 8/2005 |
| JP | 2007-199898 | 8/2007 |

OTHER PUBLICATIONS

Office Action dated Jul. 27, 2011, issued in the corresponding Japanese Patent Application No. 2009-216611, and an English Translation thereof.
Chinese Official Action dated Mar. 5, 2013 issued in the corresponding Chinese Patent Application No. 201010282960.3 and English language translation.

* cited by examiner

*Primary Examiner* — Douglas Tran
(74) *Attorney, Agent, or Firm* — Buchanan Ingersoll & Rooney PC

(57) ABSTRACT

In the image forming apparatus, when the document data is developed to generate the print data in order to print out by the document data, the possibility of repeated requests to print out by the document data is determined by whether or not the document data is stored in the shared directory, or whether or not the document data is attached to the electronic mail distributed to a plurality of people. If the need of storing the document data has been determined, the document data is stored in the image forming apparatus. Upon receipt of a request to print out by the same document data as this document data, the stored print data is used for printing.

12 Claims, 15 Drawing Sheets

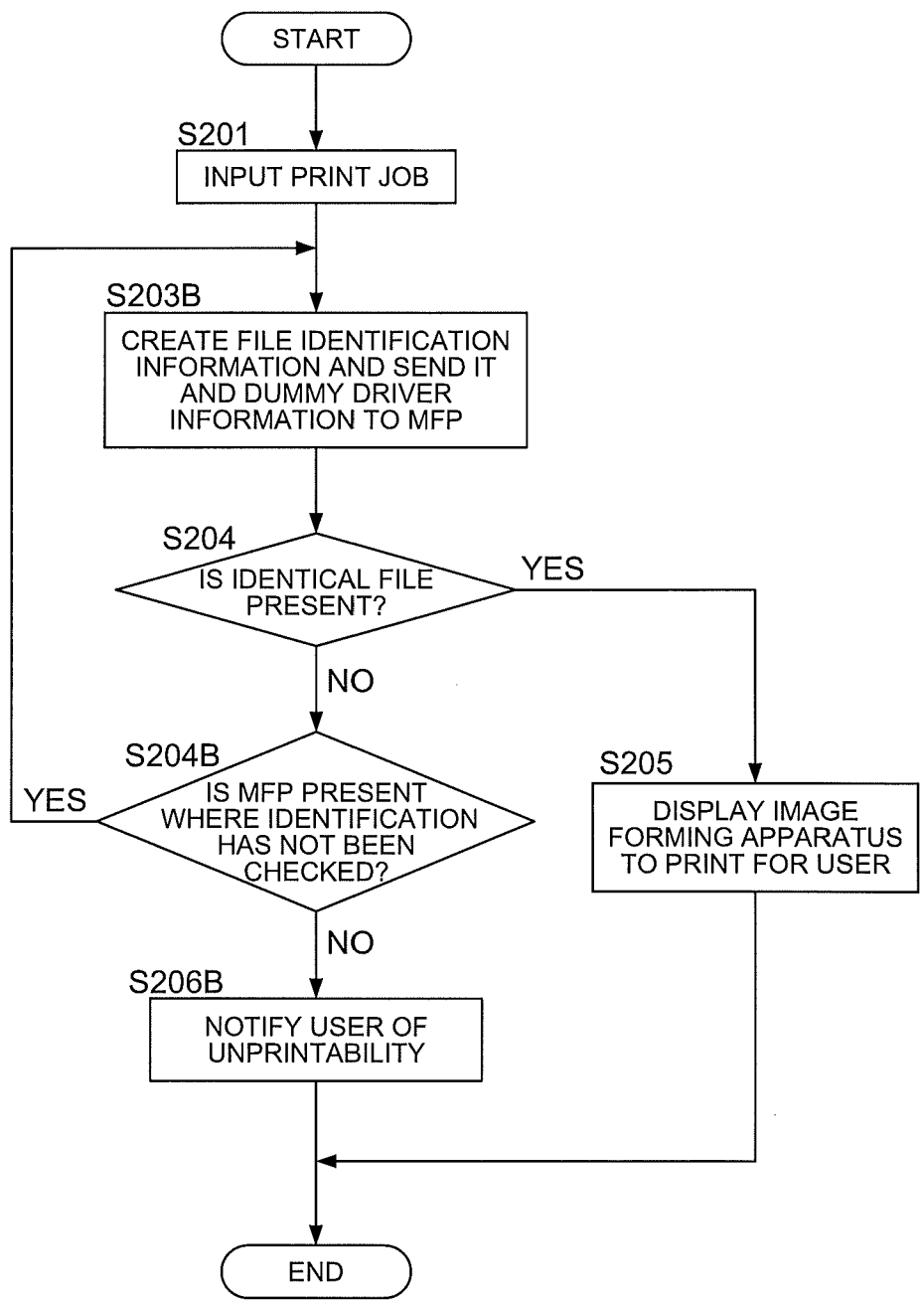

IMAGE FORMING APPARATUS WHICH DETERMINES NECESSITY OF STORING PRINT DATA

This application is based on Japanese Patent Application No. 2009-216611 filed on Sep. 18, 2009 with Japanese Patent Office, the entire content of which is hereby incorporated by reference.

BACKGROUND OF THE INVENTION

The present invention relates to an image forming apparatus capable of storing the print data obtained from the development of document data, and performing a printing operation by reusing this data.

When the document data created by such an information processing apparatus as a personal computer is to be printed by a user using an image forming apparatus such as a printer, document data is generally converted into PDL (Page Description Language) data by a printer driver for designating the printing by document data, and this PDL data is sent to a printer. The PDL data sent to the printer is subjected to ripping at the development section of the printer, whereby the image data is developed. The image of this image data is formed on a recording sheet by a printing section, and the document data is printed by the printer.

Thus, in the aforementioned case, the document data is subjected to two data format conversions before data printing subsequent to data creation. This conversion is carried out every time the document data printing instruction is given. When the same document data is to be printed, printing can be performed using the print data having been converted from the document data and subjected to ripping. This arrangement eliminates such data conversion and reduces the printing time.

There is a printer control apparatus wherein the print data already developed when the document data is printed is stored in a storage device and is reused (e.g., Unexamined Japanese Patent Application Publication No. Hei 9 (1997)-174956).

An example of the apparatus capable of distributing the document data is found in an electronic mail processing apparatus that automatically creates a mail provided with document data used at a conference, and automatically distributes the same to all the relevant participants of the conference (e.g., Unexamined Japanese Patent Application Publication No. 2003-196208).

In the Unexamined Japanese Patent Application Publication No. Hei 9 (1997)-174956, all the print data developed by the development section in the first printing operation is stored and the stored data is reused, whereby the printing time at the time of repeated printing is reduced. However, if all the print data is stored, a problem with the storage capacity will occur. Further, if the user performs an input operation to determine if the print data is stored or not, the operation will become complicated.

In the Unexamined Japanese Patent Application Publication No. 2003-196208, the document data to be used in a conference is automatically distributed to the participants of the conference by mail in advance. This ensures that the participants of the conference get document data easily. However, when the acquired document data is to be printed, the document data is converted into PDL data, which is then converted into image data. This fails to cut down the document data printing time.

In view of the problems described above, it is an object of the present invention to provide an image forming apparatus capable of storing the developed print data of the document data, reducing the printing time by reusing the stored data, and automatically selecting the print data to be stored.

SUMMARY

To achieve at least one of the abovementioned objects, an image forming apparatus reflecting one aspect of the present invention includes the following.

[1] An image forming apparatus including:
a development section which develops received document data into print data;
a storage section;
a printing section; and
a control section which determines whether or not it is necessary to store the print data obtained by allowing the development section to develop the document data, by conducting evaluation regarding possibility of repeated request for printing for the document data, and which allows the storage section to store the print data therein if the storage of the print data is necessary, and further which allows the printing section to perform printing related to the printing request using the print data when receiving the printing request of the document data, if the print data corresponding to the document data is stored in the storage section.

[2] The image forming apparatus described in the embodiment item [1] wherein the control section detects, as the evaluation, whether or not the document data is stored in a predetermined storage device in which the document data can be accessed by a plurality of users, and the control section determines it is necessary to store the print data of the document data if the document data is stored in the storage device.

[3] The image forming apparatus described in the embodiment item [1] or [2] wherein the control section detects, as the evaluation, whether or not the document data has been distributed to a plurality of users, and the control section determines it is necessary to store the print data of the document data if the document data has been distributed to the plurality of users.

[4] The image forming apparatus described in the embodiment item [3] wherein the document data is distributed to the plurality of users by sending an electronic mail including the document data attached thereto, from a mail server to the plurality of users, and the control section accesses the mail server to detect whether or not the document data has been sent to the plurality of users.

[5] The image forming apparatus described in any one of the embodiment items [1] through [4] wherein the control section associates the print data having been determined to need to be stored, with an identification information of the document data which has been developed into the print data, and allows the storage section to store the associated print data therein, and when the control section receives the printing request including the identification information of the document data, the control section checks whether or not the print data corresponding to the document data is stored in the storage section, by checking whether or not the print data associated with same identification information as the identification information included in the printing request is stored in the storage section.

[6] The image forming apparatus described in any one of the embodiment items [1] through [5] wherein the control section conducts the evaluation for the document data which has been received together with the printing request.

BRIEF DESCRIPTION OF THE DRAWINGS

FIG. 15 is a flow diagram representing the operation of a client PC in the fifth embodiment.

DETAILED DESCRIPTION OF THE PREFERRED EMBODIMENTS

Figure 1:
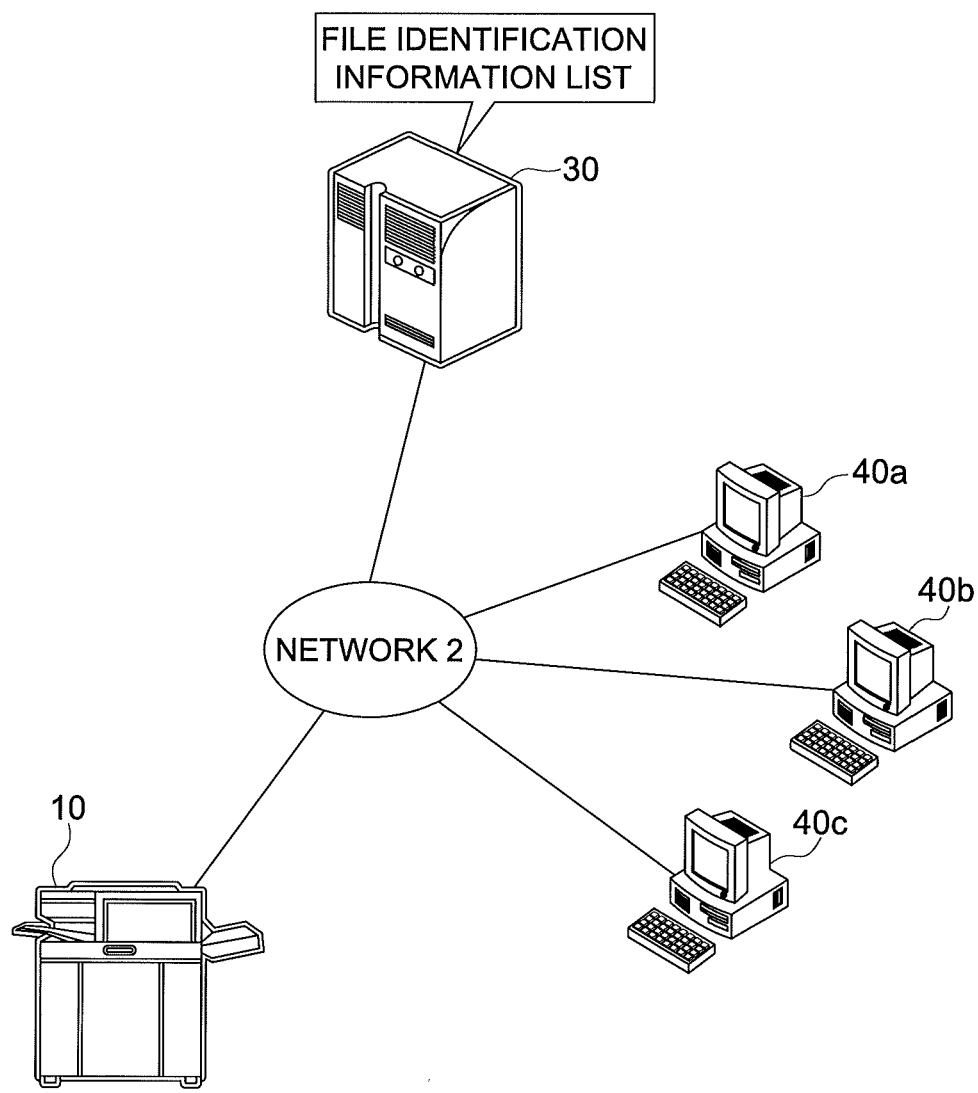
FIG. 1 is an explanatory diagram representing the schematic configuration of the image forming apparatus relating to an embodiment of the present invention.

The above-mentioned embodiments of the present invention will be further described as follows.

In the aforementioned embodiment item [1] of the invention, a step is taken to determine whether or not it is necessary to store the print data obtained by developing the document data, in conformity to the result of evaluating the possibility of the repeated request for printing by the document data. The possibility of the repeated request for printing by the document data is evaluated according to whether or not the document data printing request can be issued by a plurality of users, or whether or not the relevant data is stored in the shared directory, for example. Alternatively, the possibility of the repeated request for printing by the document data is evaluated according to whether or not the same document data as that document data has been distributed to a plurality of people, for example, according to whether or not the document data has been attached to an electronic mail to be sent to a plurality of users.

It is also possible to design the structure in such a way as to ensure that the corresponding print data should be stored, for example, on the assumption that a further printing request will be received if a request for printing by the same document data has been received more than once. The repeated printing request can be the one received from the same user or from different users.

Further, after receiving the document data printing request, the image forming apparatus checks whether or not the print data corresponding to the document data is stored in the storage section. If the corresponding print data is stored, the image forming apparatus uses this data for printing. This procedure reduces the time for printing by this document data for the second time and thereafter.

The possibility of repeated requests to print out by the document data is evaluated by the image forming apparatus at the time of receiving the printing request or at any desired time different from the time of receiving the printing request. For example, it is possible to make such arrangements that this evaluation is performed for the document data at the time of receiving the document data from a client PC before printing apart from the printing request, and the document data is developed into the print data to be stored, when the need for storage has been determined.

In the aforementioned embodiment item [2] of the present invention, the document data stored in a predetermined directory is shared by a plurality of users, and therefore, repeated printing is assumed. This arrangement ensures that, if the shared document data is printed once, the print data developed from this document data is stored in the storage section. When the request for printing by this document data has been received again, the stored print data is utilized, whereby the time of printing by this document data will be reduced thereafter.

In the aforementioned embodiment item [3] of the invention, the document data distributed to a plurality of users is considered to be printed repeatedly. This arrangement ensures that, if the distributed document data is printed once, the print data developed from this document data is stored in the storage section. The stored print data is utilized, whereby the time of printing by this document data is reduced.

The document data is sent to a plurality of users according to the following patterns, for example, (1) distribution of the same document data to a plurality of users, (2) distribution of an electronic mail with the document data to a plurality of users, and (3) distribution of a recording medium containing the document data to a plurality of users. The presence or absence of the distribution can be checked in conformity to the method of distribution, for example, by checking with the distribution server or making a decision based on the contents of the document data. For example, in the case of a conference document, the presence or absence of distribution can be checked based on the conference participant information.

In the aforementioned embodiment item [4] of the invention, whether or not the document data has been sent to a plurality of users is checked by referring to the mail server in charge of distributing the electronic mail containing the document data.

In the aforementioned embodiment item [5] of the invention, the document data and the print data of this document data having already been developed are associated using the identification information as a key. To be more specific, the identification information of the document data and the print data of this document data are stored in the associated state. This arrangement makes it possible to check whether or not the print data corresponding to the document data is stored, by checking whether or not the identification information of the document data is stored. This makes it possible to check whether the print data converted from the target document data is stored or not, even if the data format has been converted.

In the aforementioned embodiment item [6] of the invention, the document data having been received by the image forming apparatus together with the printing request is used to print out and, at the same time, evaluation is made to check the possibility of this document data to be printed repeatedly. If storage of the print data is determined necessary, the print data of this document data having been developed by the development section is stored in the storage section.

The following describes the embodiments of the present invention in detail with respect to the drawings.

FIG. 1 shows the schematic configuration of the image forming apparatus relating to the first embodiment of the present invention. The image forming apparatus 10 is a digital multi-functional peripheral (MFP) equipped with a copying function of reading a document image, forming the reproduced image thereof on a sheet of paper and outputting the same, and a printing function of developing the document data received from an external device into the print data, and printing using the same.

In FIG. 1, a file server 30, client PC 40a, client PC 40b, and client PC 40c are connected communicably to the image forming apparatus 10 through a network 2. The file server 30 manages the files stored in two storage components such as a shared directory for storing the files (e.g., document data) accessible to a plurality of users, and a non-shared directory (inaccessible to other users) for storing the files to be employed by each user. The clients PC 40a, 40b, and 40c are information processing apparatuses serving as the input terminals of the image forming apparatus 10. Further, either wired or wireless connection can be used for connection with the network 2.

In FIG. 1, when the document data stored in the file server 30 is used to print out, the following steps are taken for processing. In the first place, each client PC (e.g., client PC 40a) reads out of the file server 30 the document data to be used to print by the MFP (e.g., image forming apparatus 10). The document data having been read out is developed into the PDL data by the printer driver on each client PC. Then each client PC sends the PDL data to the image forming apparatus 10, and the image forming apparatus 10 having received the PDL data rasterizes the same, whereby the PDL data is developed into the print data and the generated print data is used for printing by the image forming apparatus 10.

In addition to the function as the normal MFP, the image forming apparatus 10 is provided with the functions of evaluating the possibility that for the document data printed by the image forming apparatus 10, repeated printing requests will be received, and determining whether or not the print data of this document data should be stored, based on the result of the evaluation, and then storing the print data whose storage is determined to be necessary into the storage section of the image forming apparatus 10.

For example, in FIG. 1, the shared directory of the file server 30 stores the document data accessible to a plurality of users (shared by these users). In this case, the image forming apparatus 10 relating to the first embodiment refers to the file server 30 to see whether or not the document data subjected to a printing request is stored in the share directory of the file server 30.

If the document data is stored in the shared directory, the image forming apparatus 10 determines that the print data of this document data should be stored, and allows the storage section of the image forming apparatus 10 to store the print data. Further, if the document data is not stored in the shared directory, a step is taken to determine that there is no need of storing this print data. In this case, the image forming apparatus 10 sends the file identification information to the file server 30, as the information for identifying the document data that is the object of evaluation.

The file identification information is a form of meta-data (data for showing the type of a particular piece of data) for checking the identity of the file. The file identification information can be any desired information if it is capable of uniquely specifying a file. For example, the name of directory where the file is stored and file name can be used. A unique identification number assigned to each file in any manner can also be used.

The data in which the file name, file check sum, and file updated time are associated with one another is used as file identification information for a specific stored file, with consideration given to the possibility that the identity of the file may be lost by updating even if the name of directory where the file is stored and file name are the same. Any one of the check sum and updated time can be used.

The file identification information will be updated if the contents of the file as the target of identification (e.g., description contents of the document data) have been updated. Even if the storage format of the file as the target of identification has been changed (e.g., the document data being developed into the print data), the file identification information is not changed. This arrangement ensures that, when the storage format of a certain piece of document data has been developed into the PDL data or bit map data for example, in printing, the file identification information on the document data prior to development is stored. This allows the image forming apparatus 10 and file server 30 to determine whether the files are the same or not.

Here the file server 30 creates the file identification information for the file stored in the shared directory inside the file server 30, and stores the list thereof (assumed as a file identification information list) in advance.

To be more specific, when a new file has been added to the shared directory or the file in the shared directory has been changed, the check sum of the file thereof (document data being stored) is generated, and data in which the file name, check sum, and updated time of this file (document data) are associated with one another is added to the list as the file identification information of that file, or the list is updated. Further, when a file has been deleted from the shared directory, the file identification information of its file is deleted from the list.

When, together with the file identification information for specifying the object of checking, a request has been received from the image forming apparatus 10 to check whether or not a file is the shared file or not, a step is taken to determine whether or not the file identification information matching the received file identification information is stored in the file identification information list. If the file identification information matching the received file identification information is stored, the image forming apparatus 10 receives the response indicating that the file being checked is stored in the shared directory. If such file identification information is not stored, the image forming apparatus 10 receives the response indicating that the file being checked is not stored in the shared directory.

In addition to the aforementioned checkup operation, the file identification information can also be used as a search key to check whether or not the print data resulting from development of the document data is already stored in the storage section of the image forming apparatus 10, when a document data printing request has been received from a client PC.

The printer driver of the image forming apparatus 10 is installed in the clients PC 40a through 40c. This printer driver has functions so that, after receiving the operation input to print out by the document data in the image forming apparatus 10, this printer driver may create the file identification information of the document data, and send the printing request by the document data and the created file identification information to the image forming apparatus 10. This file identification information is created according to the same standards as those of the file identification information to be created by the file server 30.

Figure 2:
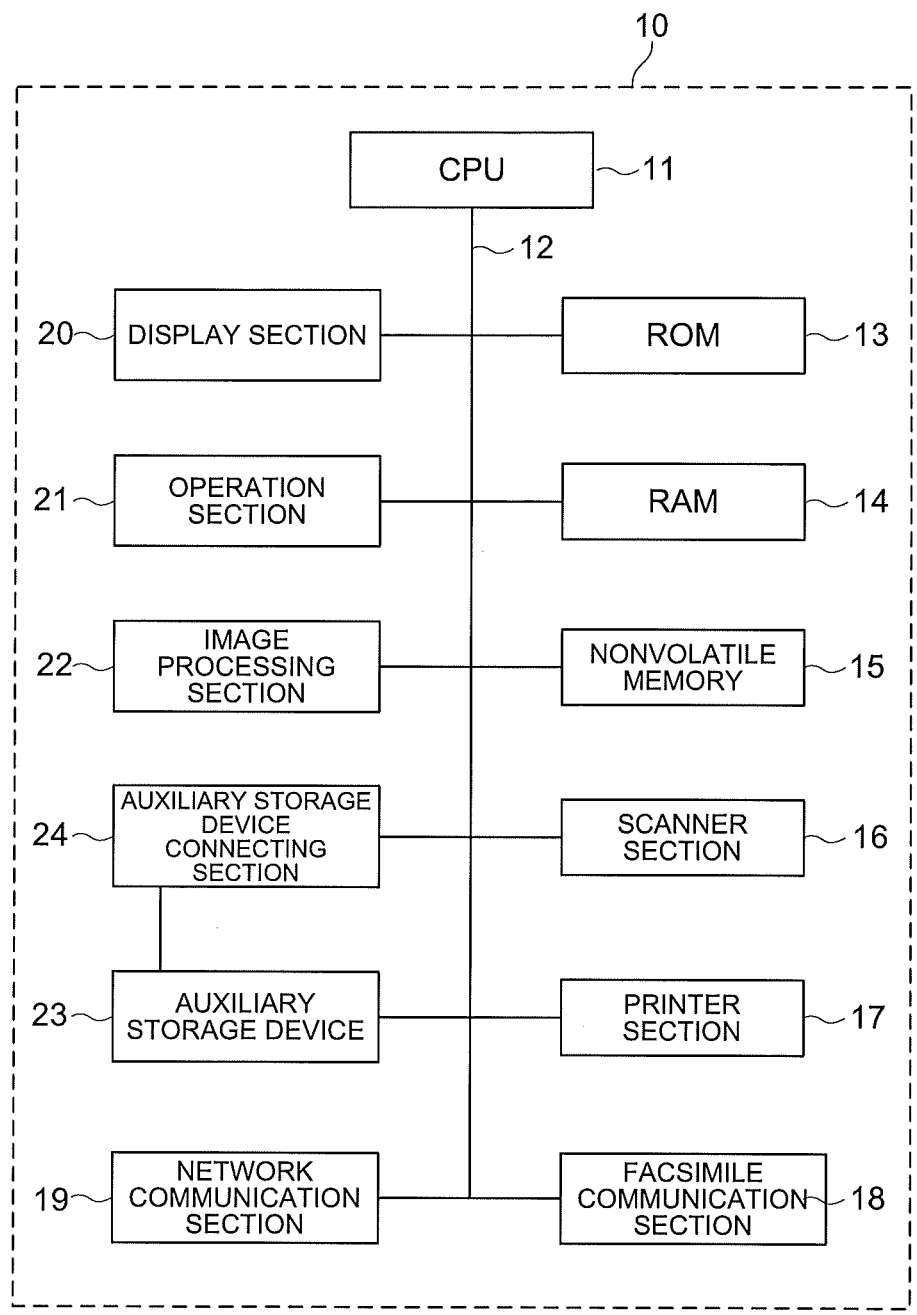
FIG. 2 is a block diagram representing the schematic configuration of the image forming apparatus relating to an embodiment of the present invention.

FIG. 2 is a block diagram showing the structure of the image forming apparatus relating to an embodiment of the present invention. The image forming apparatus 10 is composed of the CPU (Central Processing Unit) 11 as a control section for administrative control of the operations of the image forming apparatus 10, which is connected with a ROM (Read Only Memory) 13, RAM (Random Access Memory) 14, nonvolatile memory 15, scanner section 16, printer section 17, facsimile communication section 18, network communication section 19, display section 20, operation section 21, image processing section 22, and auxiliary storage device connecting section 24 through the bus 12. An auxiliary storage device 23 is connected under the control of the auxiliary storage device connecting section 24.

The ROM 13 incorporates various forms of programs. The CPU 11 executes processing in conformity to these programs, whereby various functions of the image forming apparatus 10 are implemented. The RAM 14 is a Random Access Memory used as a work memory for temporarily storing various forms of data for execution of the programs by the CPU 11, an image memory for storing an image and a communication buffer for temporarily storing the data related to transmission and reception of signals.

The nonvolatile memory 15 is a rewritable memory capable of storing the data even if the power has been turned off. This nonvolatile memory 15 stores the various forms of settings (setting values) provided for the image forming apparatus 10.

The network communication section 19 exchanges various forms of data and information by communicating with such a terminal device as a PC (e.g., client PC 40*a*) or a server (e.g., file server 30) via the network such as a LAN (Local Area Network).

The scanner section 16 optically reads a document to get an image. This scanner section 16 includes a light source for applying light to a document, a line image sensor for reading one line equivalent across the document using the reflected light having been received, a moving device for sequentially moving the readout position in units of line along the length of the document, an optical path composed of a lens and mirror for leading the light reflected from the document to the line image sensor so that an image is formed, and a converter for converting the analog image signal outputted from the line image sensor, into a digital image signal.

The printer section 17 serves as a printing section that prints out an image on a recording sheet in conformity to the image signal. Here the printer section 17 includes a recording sheet conveyance device, photoreceptor drum, charging device, laser unit, development device, transfer device, separation device, cleaning device, and fixing device. The printer section 17 is structured as a so-called laser printer that provides image formation using the electrophotographic process.

The facsimile communication section 18 takes charge of communication control for facsimile transmission and reception, call request (dialing), call-in, and linkage with a telephone line.

The display section 20 has functions to display various forms of operation screens, setting screens, guide screens, and alarm screens as a UI (User Interface), and is formed, for example, of a liquid crystal display (LCD).

The operation section 21 has functions to receive various forms of operations from the user and notify the CPU 11 of the received information. This operation section 21 includes a touch panel provided, for example, on the screen of the display section 20, ten-key pad, start button, and function mode keys.

The image processing section 22 serves as a development section that applies the process of rasterization for developing the document data received from an external terminal device, into the image data (bit map data).

The auxiliary storage device 23 is a large-capacity nonvolatile storage device, and serves as a storage section for storing the data containing a great amount of information such as image data. This auxiliary storage device 23 is a hard disk drive, for example. Further, it can be confirmed that the setting values stored in the nonvolatile memory 15 are stored in this device. This auxiliary storage device 23 also stores the print data whose storage has been determined to be necessary, and the file identification information of the document data as the source from which the print data is developed, wherein the aforementioned print data and the file identification information are associated with each other.

The following describes the operation of the image forming apparatus 10.

Figure 3:
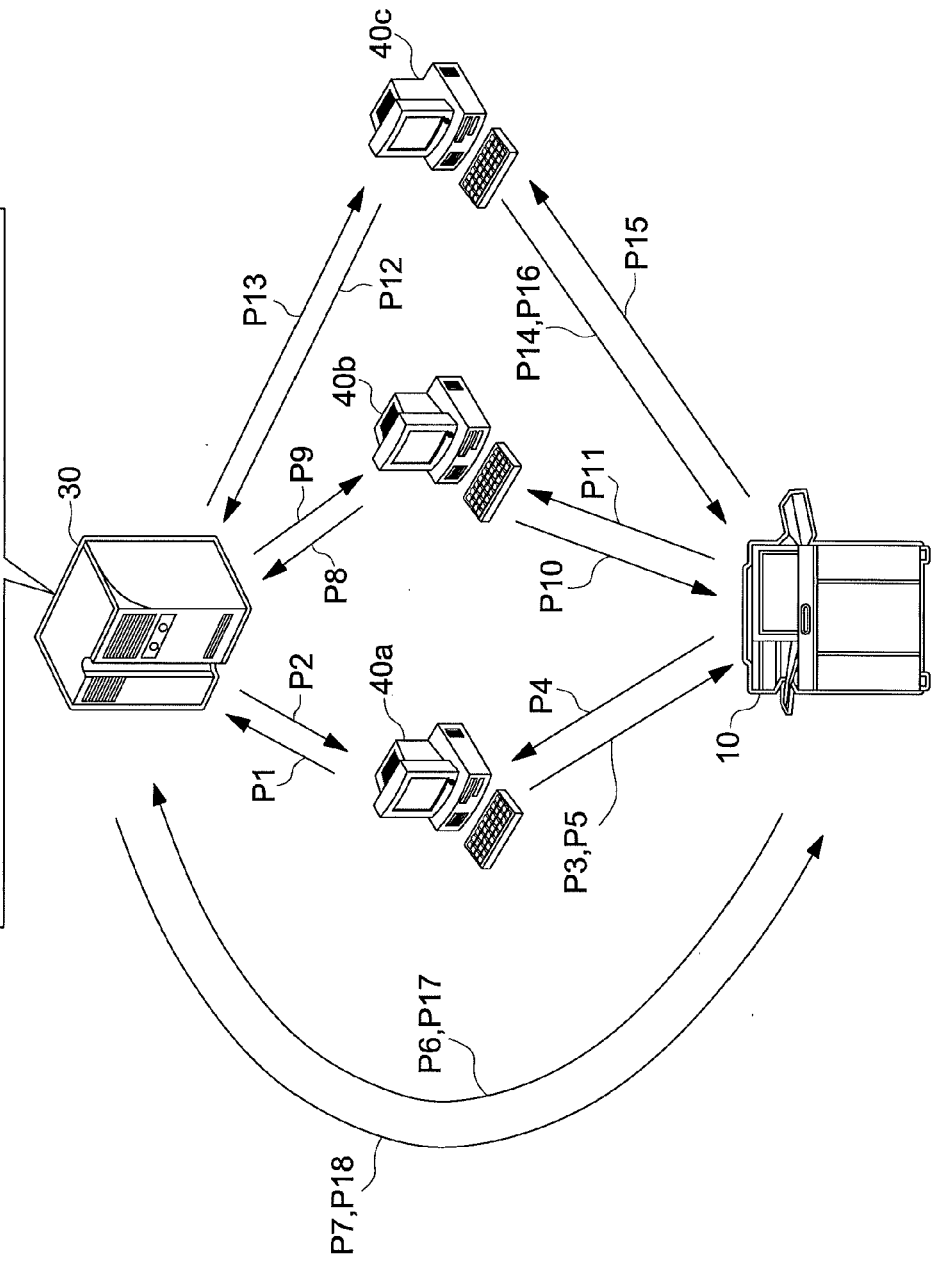
FIG. 3 is an explanatory diagram representing an example of the operation when the document data shared by the file sharing server is repeatedly printed out.

FIG. 3 shows an example of the system configuration and operation sequence when the printing job of the document data stored in the file server 30 is sent to the image forming apparatus 10 by the client PC 40*a*, client PC 40*b* and client PC 40*c*. For example, in this case, the file server 30, client PC 40*a*, client PC 40*b*, and client PC 40*c* are connected to the image forming apparatus 10 via the network.

The file server 30 manages the files stored into the shared directory accessible to a plurality of users and the non-shared directory monopolized by each user. For example, in this case, the shared directory of the file server 30 stores the document data A and the non-shared directory stores the document data B.

The following description assumes that the printing request for the document data A is first made to the image forming apparatus 10 by the client PC 40*a*, and the same printing request for the document data A is the made to the image forming apparatus 10 by the client PC 40*b*. It is also assumed that the request to print out by the document data B is made to the image forming apparatus 10 by the client PC 40*c*.

After receiving the job of printing by the document data A stored in the shared directory of the file server 30 from the user, the client PC 40*a* requests the file server 30 to send document data A (P1). The file server 30 then sends the document data A to the client PC 40*a* (P2).

Upon receipt of the document data A from the file server 30, the client PC 40*a* creates a file identification information Af as the file identification information of the document data A using its own printer driver, and sends a printing request including the file identification information Af to the image forming apparatus 10 (P3).

Upon receipt of the printing request including the file identification information Af from the client PC 40*a*, the image forming apparatus 10 checks whether or not the print data Ab resulting from development of the document data A is stored in its own auxiliary storage device 23, by verifying the contents of the received file identification information Af (e.g., file name, check sum, and updated time) and the file identification information of the print data stored in the auxiliary storage device 23.

In this case, since the print data Ab is not stored in the auxiliary storage device 23, the image forming apparatus 10 sends a transmission request of the PDL data Ap of the document data A to the client PC 40*a* (P4). After receiving the transmission request of the PDL data Ap from the image forming apparatus 10, the client PC 40a develops the document data A into PDL data Ap using a printer driver and sends the PDL data Ap to the image forming apparatus 10 (P5).

Upon receipt of the PDL data Ap from the client PC 40a, the image forming apparatus 10 develops the PDL data Ap using the image processing section 22, and generates the print data Ab as the print data of the document data A.

To evaluate the possibility of repeated requests to print out by the document data A, the image forming apparatus 10 sends the storage checking request including the file identification information Af to the file server 30 and refers to the file server 30 to check whether or not the document data A is stored in the shared directory of the file server 30 (P6). To put it more specifically, to refer to the file server 30, the image forming apparatus 10 sends the storage verification request including the file identification information Af to the file server 30.

Upon receipt of the storage verification request including the file identification information Af from the image forming apparatus 10, the file server 30 verifies whether or not the document data A is stored in the shared directory of the file server 30, by checking the contents of the file identification information Af (file name, check sum, and updated time) against the contents of the file identification information list stored in this server, and sends the verification response representing the result of verification to the image forming apparatus 10 (P7).

To be more specific, if something in common is found, the verification response showing that the file is stored in the shared directory is sent to the image forming apparatus 10. If something in common is not found, the verification response showing that the file is not stored in the shared directory is sent to the image forming apparatus 10. In this case, verification response showing that the document data A is stored in the shared directory is sent.

After receiving the aforementioned verification response from the file server 30, the image forming apparatus 10 evaluates the possibility of repeated requests to print out by the aforementioned document data A, based on the contents of the verification response. To be more specific, if the document data A is stored in the shared directory, evaluation is made in such a way that there will be repeated requests to print out by the document data A, and there is the need of storing the print data Ab corresponding to the document data A.

If the document data A is not stored in the shared directory, evaluation is made in such a way that there will be no repeated request to print out by the document data A, and there is no need of storing the print data Ab corresponding to the document data A. In this case, the verification response that the document data A is stored in the shared directory has been received from the file server 30. Thus, evaluation is made in such a way that there will be repeated requests to print out by the document data A, and the print data Ab and file identification information Af are associated with each other and are stored in the auxiliary storage device 23.

The print data Ab already developed and the file identification information Af as the file identification information of the document data A before being developed are associated with each other and are stored. This makes it possible to verify that the request is the printing request for the same document data as that having been previously requested for printing, by verifying the matching between each of file name, check sum and updated time items of the newly received file identification information, and the stored file identification information.

This arrangement allows printing operations to be made by reusing the stored print data Ab, when there is a request for reprinting by the document data A, with the result that printing time is reduced. The image forming apparatus 10 prints out for the document data A using the print data Ab, after whether or not the print data Ab should be stored is determined.

After the aforementioned printing has been completed based on the request from the client PC 40a, the client PC 40b receives the start instruction of the job to print out by the document data A stored in the shared directory of the file server 30 from the user. The client PC 40b having received the instruction of this printing job acquires the document data A from the file server 30 (P8 and P9), similarly to P1 and P2. Then similarly to P3, the client PC 40b creates the file identification information Af using its own printer driver and sends the printing request including this file identification information Af to the image forming apparatus 10 (P10).

Upon receipt of the printing request including the file identification information Af from the client PC 40b, the image forming apparatus 10 checks whether or not the print data Ab is stored in the auxiliary storage device 23 of the image forming apparatus 10, by searching for matching between the received file identification information Af and stored file identification information.

In this case, the print data Ab is stored in the auxiliary storage device 23. Thus, the image forming apparatus 10 sends the notification of starting printing by the document data A to the client PC 40b (P11), and starts printing for the document data A using the stored print data Ab. After receiving this notification from the image forming apparatus 10, the client PC 40b terminates the processing in response to the request of printing by the document data A.

Further, the client PC 40c receives the start instruction of the job of printing by the document data B stored in the non-shared directory of the file server 30 from the user. Having received the instruction of the printing job, the client PC 40C acquires the document data B from the file server 30 (P12 and P13) similarly to P1 and P2. Then similarly to the case of P3, the client PC 40c uses its own printer driver to create the file identification information Bf as the file identification information of document data B. The printing request including the file identification information Bf is then sent to the image forming apparatus 10 (P14).

Upon receipt of the printing request including the file identification information Bf from the client PC 40c, the image forming apparatus 10 checks whether or not the print data Bb is stored in the auxiliary storage device 23 of the image forming apparatus 10, by searching for matching between the received file identification information Bf and the file identification information of the print data stored in the same image forming apparatus.

In this case, the print data Bb is not stored in the auxiliary storage device 23. Thus, the image forming apparatus 10 requests the client PC 40c to send the PDL data Bp which is the PDL data of the document data B (P15).

Having received the request to send the PDL data Bp from the image forming apparatus 10, the client PC 40c uses the printer driver to develop the document data B into the PDL data Bp, and sends the PDL data Bp to the image forming apparatus 10 (P16).

Having received the PDL data Bp from the client PC 40c, the image forming apparatus 10 develops the PDL data Bp using the image processing section 22 of the image forming apparatus 10, and generates the print data Bb that is the print data of the document data B.

To evaluate the possibility of repeated requests to print out by the document data B, the image forming apparatus 10 sends the storage verification request including the file identification information Bf of the document data B to the file server 30, and refers to the file server 30 to check whether or not the document data B is stored in the shared directory of the file server 30 (P17).

After receiving the storage verification request including the file identification information Bf from the image forming apparatus 10, the file server 30 checks whether or not the document data B is stored in the shared directory of the file server 30, by checking the contents of the file identification information Bf (file name, check sum, and updated time) against the contents of the file identification information list stored in the same server, similarly to P7. Then the verification response representing the result thereof is sent to the image forming apparatus 10 (P18). In this case, the file server 30 sends the verification response representing absence of the document data B in the shared directory to the image forming apparatus 10.

After receiving the verification response from the file server 30, the image forming apparatus 10 recognizes from the contents of the verification response that the document data B is not stored in the shared directory of the file server 30, and determines that there will be no repeated request to print out by the aforementioned document data B. Thus, the file identification information Bf and print data Bb are not stored in the associated state between them. This decision is followed by the image forming apparatus 10 starting to print out for the document data B using the print data Bb. Upon receipt of the notification that the printing by the document data B is performed by the image forming apparatus 10, the client PC 40c terminates the processing in response to the request for printing by the document data B.

Figure 4:
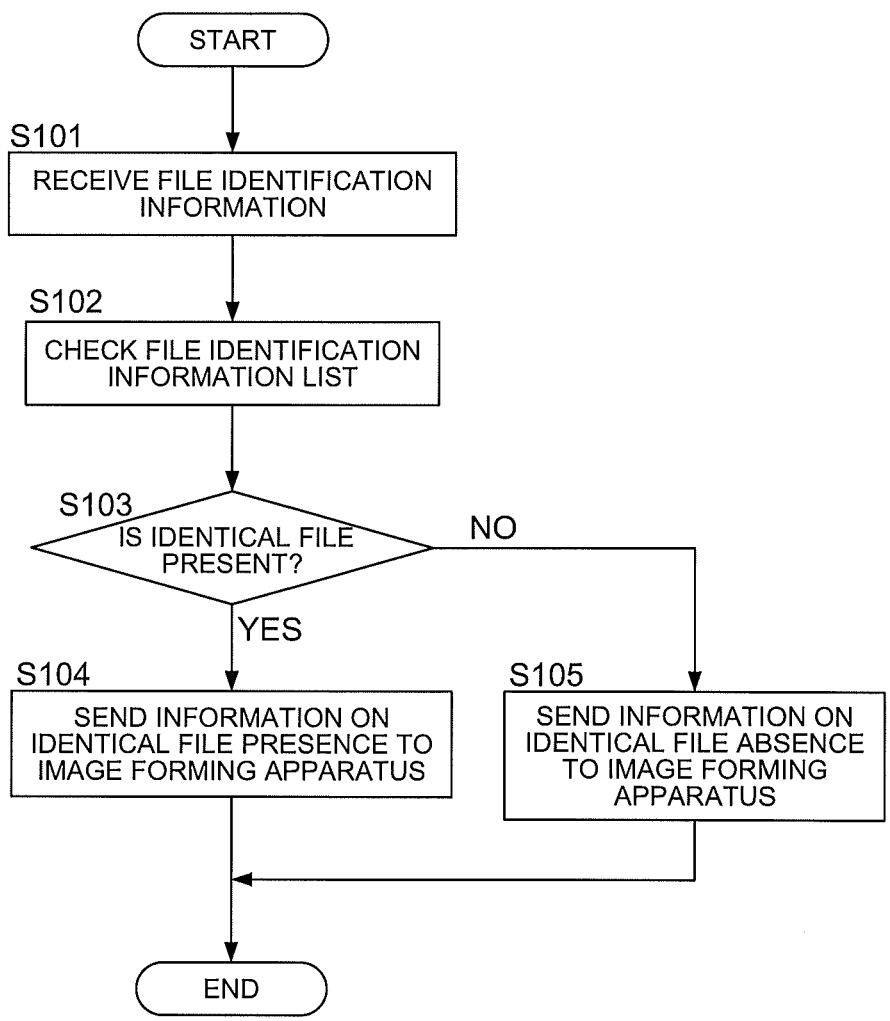
FIG. 4 is a flow diagram representing the operation of a file sharing server.

FIG. 4 shows the operation flow of the file server 30. Upon receipt of the storage verification request including the file identification information from the image forming apparatus 10 (Step S101, FIG. 3; P6 and P17), the file server 30 checks the received file identification information against the file identification information list stored in the file server 30 (Step S102), and verifies whether or not the document data is stored in the shared directory (Step S103).

If the document data matching the received file identification information is stored in the shared directory (that is, the received file identification information is found in the file identification information list) (Step S103; Yes), the verification response representing the presence of the document data in the shared directory is sent to the image forming apparatus 10 (Step S104, FIG. 3; P7). Then this processing terminates (END).

If the document data is not found in the shared directory (that is, the received file identification information is not found in the file identification information list) (Step S103; No), the verification response representing the absence of the document data in the shared directory is sent to the image forming apparatus 10 by the file server 30 (Step S105, FIG. 3; P18). Then this processing terminates (END).

Figure 5:
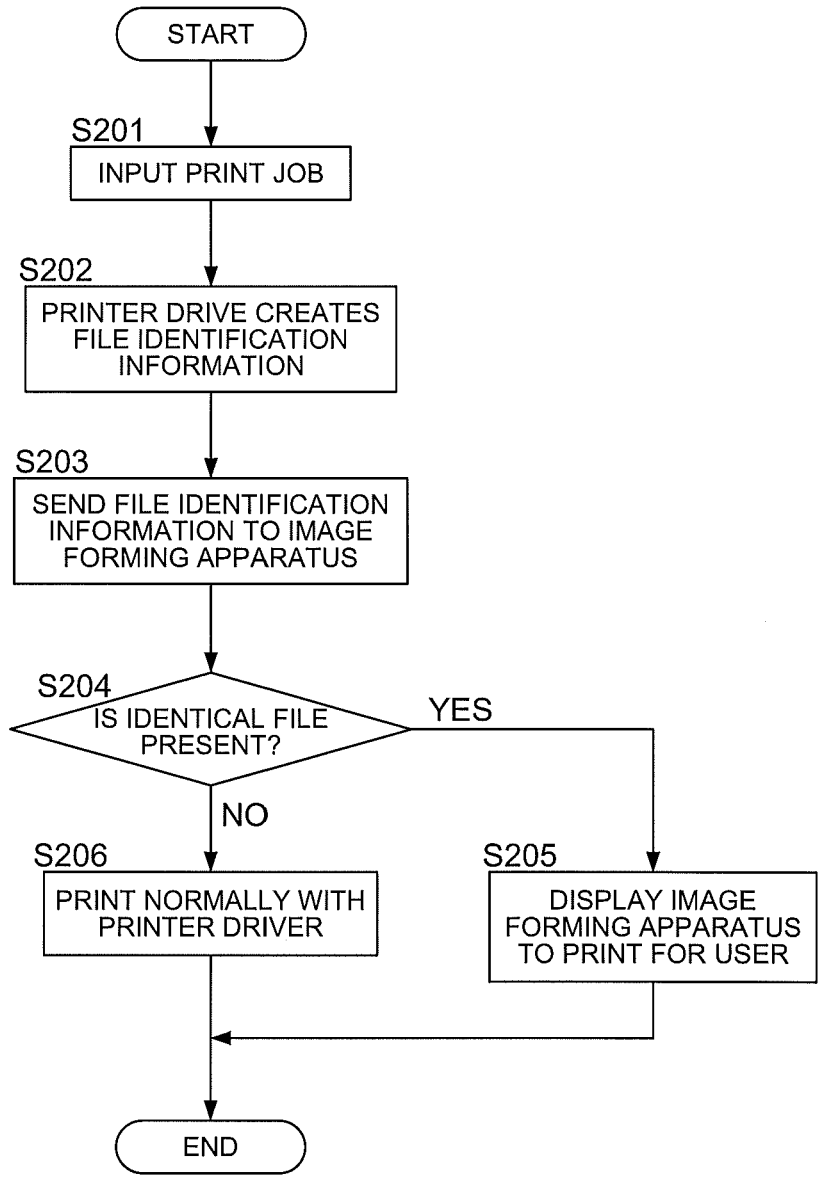
FIG. 5 is a flow diagram representing the operation of a client PC.

FIG. 5 shows the operation flow of the client PC. After receiving a printing job for a document data from the user (Step S201), the client PC acquires the document data from the file server 30, and uses its own printer driver to create the file identification information of the document data (Step S202, FIG. 3; P2, P9 and P13). The printing request including this file identification information is sent to the image forming apparatus 10 (Step S203, FIG. 3; P3, P10 and P14). Then a step is taken to check whether or not the print data resulting from the development of the document data is stored in the image forming apparatus 10 (Step S204).

When the image forming apparatus 10 stores the print data (Step S204; Yes), the user is notified of the image forming apparatus for implementing the printing operation (wherein the print data is stored) (Step S205), and the image forming apparatus 10 is allowed to perform printing by the document data. Then this processing terminates (END).

If the image forming apparatus 10 does not store the print data (Step S204; No), normal printing operation is performed to use the printer driver. To be more specific, the printer driver is used to develop the document data into PDL data, and the PDL data is sent to the image forming apparatus 10 (Step S206, FIG. 3; P5 and P16). The image forming apparatus 10 is requested to perform printing operation in conformity to this PDL data. Then this processing terminates (END).

Figure 6:
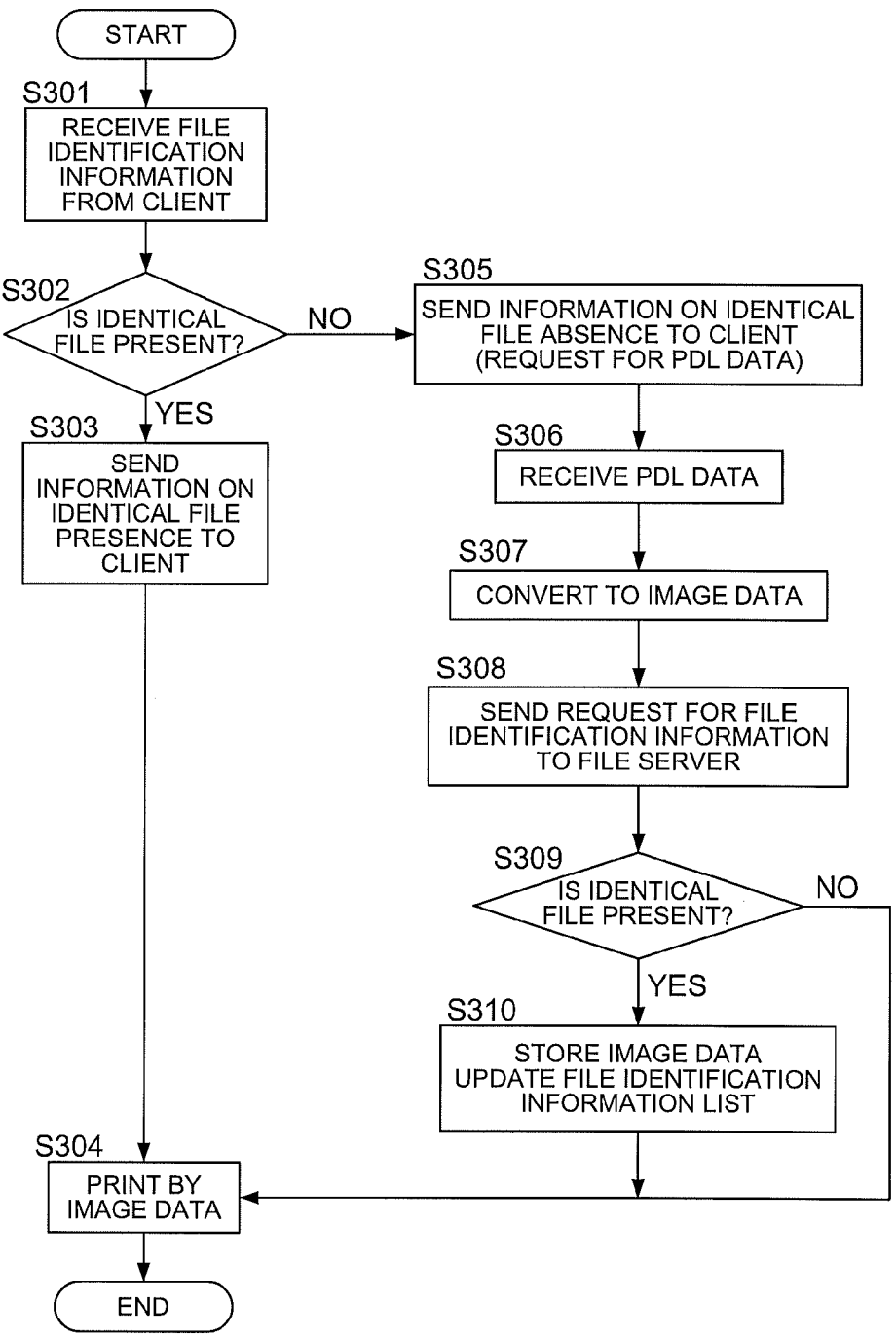
FIG. 6 is a flow diagram representing the operation of an image forming apparatus.

FIG. 6 shows the operation flow of the image forming apparatus 10. Upon receipt of a printing request including the identification information of the document data from a client PC (Step S301, FIG. 3; P3, P10 and P14), the image forming apparatus 10 checks whether or not the print data resulting from development of the document data is stored in the auxiliary storage device 23, by searching for matching between the received file identification information and the file identification information stored in the auxiliary storage device 23 (Step S302).

If the print data of the document data is stored (Step S302; Yes), the image forming apparatus 10 sends the result of the search to the client PC (Step S303, FIG. 3; P11 and P15) and uses the print data to start printing for the document data (Step S304). Then this processing terminates (END).

If the print data resulting from development of the document data is not stored (Step S302; No), the image forming apparatus 10 sends the result of the search and the PDL data transmission request for the document data to the client PC (Step S305, FIG. 3; P4 and P15). Upon receipt of the PDL data of the document data from the client PC (Step S306, FIG. 3; P5 and P16), the image forming apparatus 10 uses the image processing section 22 to develop the PDL data and generates print data (Step S307).

To determine whether or not generated print data should be stored, the image forming apparatus 10 sends to the file server 30 the storage verification request including the file identification information of the document data as the source for development (Step S308, FIG. 3; P6), and checks whether or not the document data is stored in the shared directory of the file server 30 (Step S309).

When the image forming apparatus 10 have received from the file server 30, the verification response representing that the document data is stored in the shared directory (Step S309; Yes, FIG. 3; P7), the image forming apparatus 10 associates the print data with the file identification information, and stores them in the storage section (Step S310). This print data is used to print out for the document data (Step S304). Then this processing terminates (END).

When the image forming apparatus 10 have received from the file server 30, the verification response representing that the document data is not stored in the shared directory (Step S309; No, FIG. 3; P18), the image forming apparatus 10 uses the print data to print out for the document data (Step S304) without storing the print data and the file identification information associated with each other. Then this processing terminates (END).

As described above, the image forming apparatus 10 automatically determines whether or not the print data resulting from development of the document data should be stored, by checking whether or not the document data is stored in the shared directory of the file server 30. As compared to the case wherein the requirement for storage is separately specified by each user, this arrangement reduces the user operation relating to the selection of the targets to be stored, and ensures enhanced user convenience.

The printing time is also reduced by reuse of the stored print data. Further, the file server 30 having received the storage verification request for the document data checks whether or not the document data pertains to a shared file, and the result is sent back as a verification response to the image forming apparatus 10 by the file server 30. This arrangement reduces the processing load of the image forming apparatus 10. Further, since only the verification result is sent back, the amount of transferred data can be reduced.

The following describes the second embodiment of the present invention.

In the first embodiment, to check the need of storing the print data resulting from development, the image forming apparatus 10 sends to the file server 30 the storage verification request including the file identification information of the document data to be evaluated. Upon receipt of this request, the file server 30 checks the file identification information list stored in the same server against the received file identification information, thereby verifies whether or not the document data to be evaluated is stored in the shared directory. The file server 30 sends the result of evaluation based on this checking, to the image forming apparatus 10 as a verification response.

By contrast, in the second embodiment, when the print data resulting from development has been generated, the image forming apparatus 10 sends a request for transmission of the file identification information list stored in the file server 30 to evaluate the need of the storage thereof, instead of sending, to the file server 30, the storage verification request including the file identification information of the document data to be evaluated. Based on the file identification information list received from the file server 30, the image forming apparatus 10 determines the need of storing the print data.

In the following description, the method of evaluating the need of print data storage in the first embodiment will be called the first evaluation method, and the method of evaluating the need of print data storage in the second embodiment will be called the second evaluation method. Except for the method of verifying whether the shared file or otherwise, the arrangements including the device configuration are the same as those described with reference to the first embodiment, and will not be described to avoid duplication.

Figure 7:
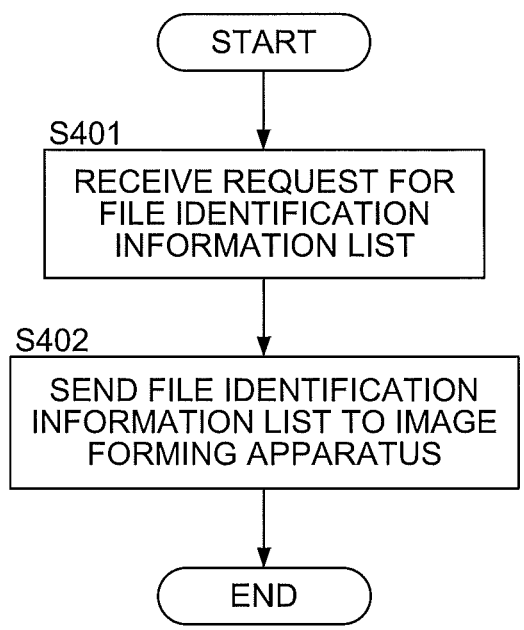
FIG. 7 is a flow diagram representing the operation of a file sharing server in the second embodiment.

FIG. 7 shows the operation flow of the file server 30 in the second embodiment. After receiving the request to transmit the file identification information list stored in the same server from the image forming apparatus 10 (Step S401), the file server 30 sends the file identification information list stored in the same server to the image forming apparatus 10 (Step S402). Then this processing terminates (END).

Figure 8:
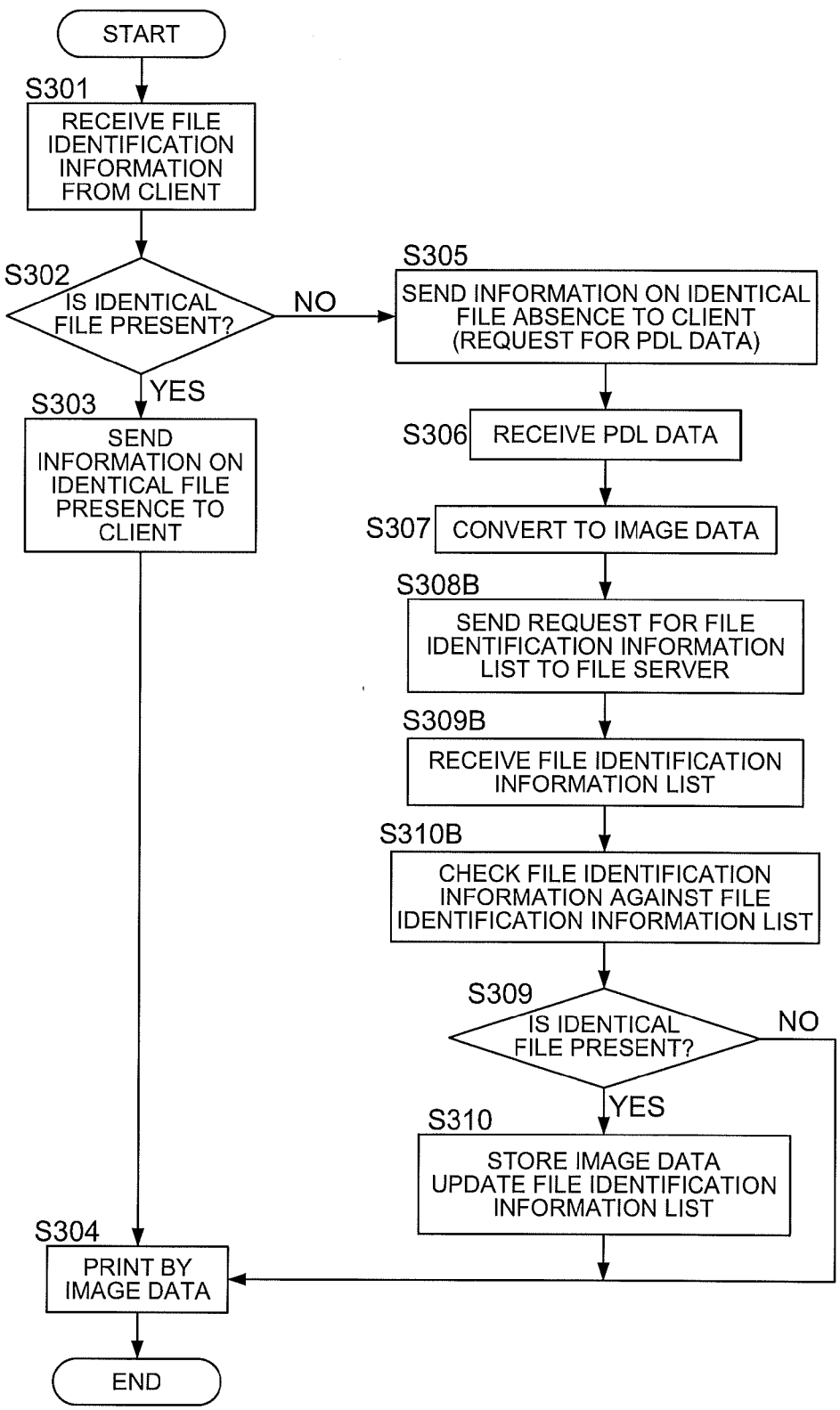
FIG. 8 is a flow diagram representing the operation of an image forming apparatus in the second embodiment.

FIG. 8 shows the operation flow of the image forming apparatus 10 in the second embodiment. In FIG. 8, the steps for the same processing as that of FIG. 6 are assigned with the same step numbers. In the following description of FIG. 8, only the steps different from those of FIG. 6 will be described.

In FIG. 8, after termination of Step S307, the image forming apparatus 10 sends the file server 30 a request of transmitting the file identification information list stored in the file server 30 (Step S308B). After receiving the file identification information list sent from the file server 30 in conformity to the transmission request (Step S309B), the image forming apparatus 10 searches for matching between the received file identification information list and the file identification information received from the client PC (Step S310B).

If the file identification information matching the file identification information received from the client PC is present in the file identification information list received from the file server 30 (Step S309; Yes), the relevant print data is associated with the file identification information and is stored in the auxiliary storage device 23 (Step S310). The printing operation based on this print data is performed (Step S304). Then the present processing terminates (END).

If the file identification information list does not contain any file identification information matching the file identification information received from the client PC (Step S309; No), printing is performed in conformity to the print data (Step S304) without the operation of storing being performed in the Step S310. Then the present processing terminates (END).

As described above, in the second embodiment, to check the need of storing the print data resulting from development of the document data, the image forming apparatus 10 acquires the file identification information list from the file server 30, and automatically makes a decision according to the file identification information list. As compared to the case wherein the requirement for storage is separately specified by each user, this arrangement reduces the user operation in the selection of the targets to be stored, and ensures enhanced user convenience. Similarly to the case of the first embodiment, this arrangement in the second embodiment saves the storage capacity for storing the print data, and cuts down the printing time.

Further, the image forming apparatus 10 acquires the file identification information list from the file server 30, and the image forming apparatus 10 determines the need of storage according to the file identification information list. This procedure reduces the processing load of the file server 30.

Further, if there is no change in the file (document data) stored in the shared directory of the file server 30 after the image forming apparatus 10 has acquired the file identification information list from the file server 30, there is no need of sending the storage verification request to the file server 30 or receiving a verification response from the file server 30. If this arrangement is adopted, the need of communication between the file server 30 and image forming apparatus 10 can be reduced.

The following describes the third embodiment of the present invention.

In the first embodiment and second embodiment, the need of storing the print data generated by the image forming apparatus 10 is determined by checking whether or not the corresponding document data is stored in the shared directory of the file server. In the third embodiment, this decision is made by checking whether or not the corresponding document data has been distributed to a plurality of users as an attachment to an electronic mail.

Figure 9:
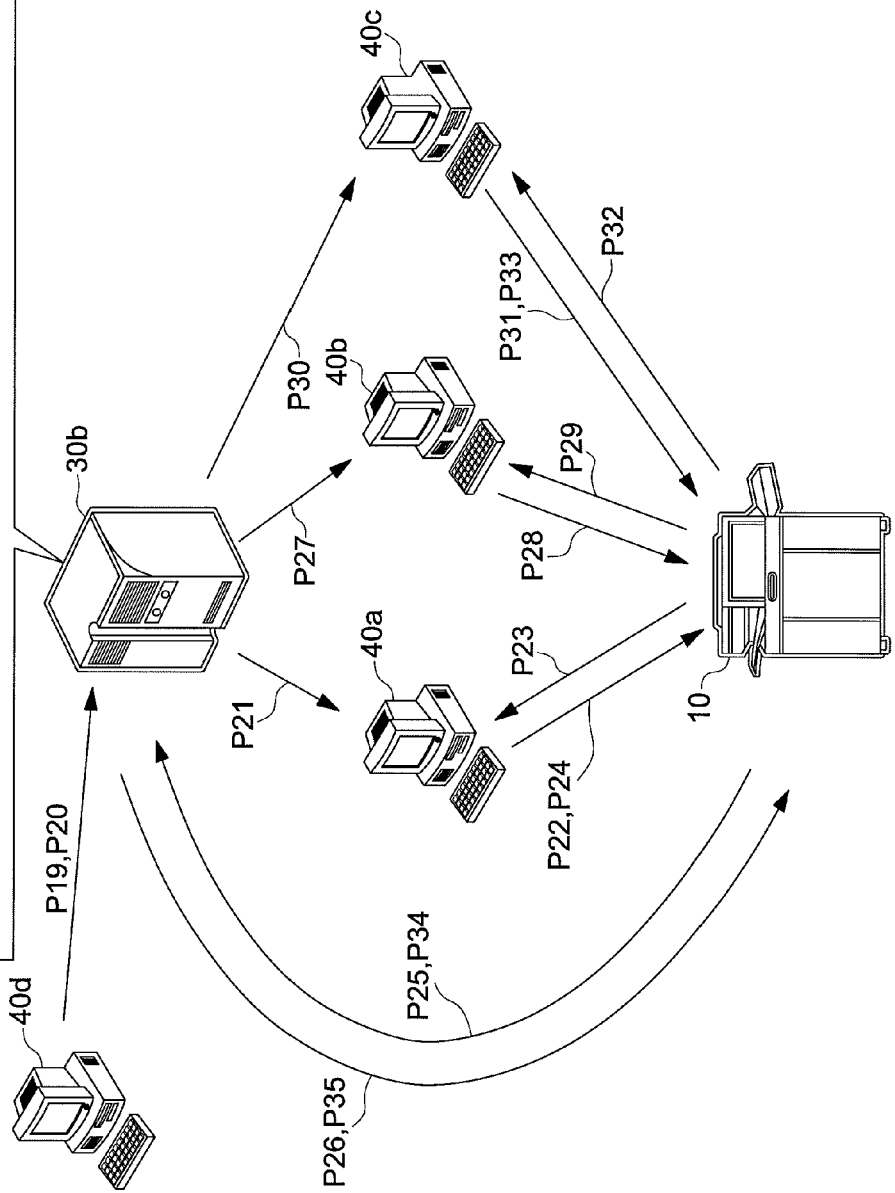
FIG. 9 is an explanatory diagram representing an example of the operation when the same document data is mailed to a plurality of users by a mail server in the third embodiment.

FIG. 9 shows an example of the system configuration and operation sequence in the third embodiment. The difference in the system configuration from that of FIG. 1 is that the file server 30 is changed into a mail server 30*b*, and there is a client PC 40*d* that sends an electronic mail to the mail server 30*b*.

The clients PC 40*a*, 40*b*, and 40*c* are arranged in such a way that the printing job relating to the file (text data) attached to the electronic mail received from the mail server 30*b* is sent to the image forming apparatus 10. The client PC 40*d* is a terminal device pertaining to a local network that is different from those of the other clients PC 40*a* through 40*c*, for example. The configuration of the image forming apparatus in the third embodiment is the same as that of FIG. 2, and will not be described to avoid duplication.

The mail server 30b manages distribution of the electronic mail received (requested to distribute) from each client PC. If there are a plurality of the addresses of the received electronic mail and the document data is attached to the file, the mail server 30b creates the file identification information of the document data and stores it in the server.

The mail server 30b stores the created file identification information for a specified period of time. The file identification information is stored in the form organized into a file identification information list B where they are listed. Similarly to the case of the first embodiment, the file identification information is only required for the information that can be identified with the corresponding document data. In this embodiment, the file identification information is made up of the file name and the check sum of the document data.

In the operation sequence of FIG. 9, the electronic mails C containing the attached document data C are distributed through the mail server 30b, whereby the document data C is distributed to the client PCs 40a and 40b, and the electronic mail D containing the attached document data D is distributed, whereby the document data D is distributed to the client PC 40c.

For example, the electronic mail C distributed to a plurality of addresses is related to a conference to be participated in by the user of the client PC 40a and user of the client PC 40b, and the document data C attached thereto is the document to be used in that conference. By contrast, the electronic mail D sent to one address is the information given only to the user of the client PC 40c. The attached document data D is used only by the user of the client PC 40c.

It is assumed that a printing request of the document data C is first issued by the client PC 40a to the image forming apparatus 10. After that, a printing request of the same document data C is issued to the image forming apparatus 10 by the client PC 40b. Also it is assumed that the client PC 40c issues a printing request of the document data D to the image forming apparatus 10.

After receiving the input operation of distributing the electronic mail C containing the document data C to a plurality of users (client PCs 40a and 40b), the client PC 40d sends this electronic mail C to the mail server 30b (P19). Since this electronic mail C is sent to a plurality of addresses and the document data C is attached thereto, the mail server 30b having received the electronic mail C creates the file identification information Cf, stores it by adding it to the file identification information list B, and distributes the electronic mail C to the client PCs 40a and 40b (P21 and P27).

After receiving the input operation of distributing the electronic mail D containing the document data D to the client PC 40c, the client PC 40d sends this electronic mail D to the mail server 30b (P20). Since this electronic mail D is to be sent to a single address, the mail server 30b having received the electronic mail D sends the electronic mail D to the client PC 40c (P30), without creating the file identification information of the document data D.

The client PC 40a receives the electronic mail C containing the document data C from the mail server 30b. After that, the client PC 40a receives the printing job of the document data C from the user. Then the client PC 40a uses its own printer driver to create the file identification information Cf of the document data C, and sends the printing request including this file identification information Cf to the image forming apparatus 10 (P22).

After receiving the printing request including the file identification information Cf from the client PC 40a, the image forming apparatus 10 checks whether or not the print data Cb resulting from development of the document data C is stored in its own auxiliary storage device 23, by checking the contents of the received file identification information Cf (e.g., file name and check sum) against the file identification information stored in the auxiliary storage device 23.

In this case, since the print data Cb is not yet stored in the auxiliary storage device 23 (there is no matching file identification information) in it, the image forming apparatus 10 sends a transmission request of the PDL data Cp for document data C to the client PC 40a (P23). After receiving the PDL data Cp transmission request from the image forming apparatus 10, the client PC 40a uses the printer driver to develop the document data C into the PDL data Cp, and sends the PDL data Cp to the image forming apparatus 10 (P24).

After receiving the PDL data Cp from the client PC 40a, the image forming apparatus 10 develops the PDL data Cp by the image processing section 22, whereby the print data Cb as the print data of the document data C is generated. To evaluate the possibility of repeated requests to print out by the document data C, the image forming apparatus 10 sends the storage verification request containing the file identification information Cf to the mail server 30b and refers to the mail server 30b to see whether or not the file identification information Cf is stored in file identification information list B of the mail server 30b (P25).

After receiving the storage verification request including the file identification information Cf from the image forming apparatus 10, the mail server 30b verifies whether or not the file identification information Cf is stored in the file identification information list B, by checking the contents of the file identification information Cf (file name and check sum) against the contents of the file identification information list B stored in the server. The verification response representing the result of checking is sent to the image forming apparatus 10 (P26). If matching is found, a notification is sent to show that the file has been distributed to a plurality of users. If matching is not found, a notification is sent to show that the file has not been distributed to a plurality of users. In this case, a verification response is sent back to show that the document data C has been distributed to a plurality of users.

The image forming apparatus 10 having received the aforementioned verification response from the mail server 30b evaluates the possibility of repeated requests to print out relating to the document data C, based on this verification response.

To be more specific, if the document data C pertains to the file having been distributed to a plurality of users, evaluation is made to determine that there will be repeated requests to print out relating to the document data C, and to determine the need of storing the print data Cb corresponding to the document data C. If the document data C does not pertain to the file having been distributed to a plurality of users, evaluation is made to determine there will not be repeated requests to print out relating to the document data C, and to determine that there is no need of storing the print data Cb corresponding to the document data C.

In this case, having received from the mail server 30b the verification response showing that the document data C have been distributed to a plurality of users, the image forming apparatus 10 evaluates the possibility of repeated requests to print out relating to the document data C, and associates the print data Cb with the file identification information Cf to store the same into the auxiliary storage device 23.

The print data Cb already developed and the file identification information Cf of document data C before being developed are associated with each other and are stored. This makes it possible to verify that the request is the request to print out by the same document data as that having been previously requested for printing, by confirming matching between the newly received file identification information (each of the file name and check sum item) and the stored file identification information.

This arrangement allows printing operations to be made by reusing the stored print data Cb, when there is a request for reprinting by the document data C, with the result that the printing time is reduced. The image forming apparatus 10 prints out for the document data C using the print data Cb, after a step has been taken to determine whether or not the print data Cb should be stored.

After the aforementioned printing has been completed based on the request from the client PC 40*a*, the client PC 40*b* receives from the user the start instruction of the job to print out by the document data C having been distributed in the form of an attachment to the electronic mail C. The client PC 40*b* having received the instruction of this printing job creates file identification information Cf using its own printer driver similarly to P20, and sends the printing request including this file identification information Cf to the image forming apparatus 10 (P28).

Upon receipt of the printing request including the file identification information Cf from the client PC 40*b*, the image forming apparatus 10 checks whether or not the print data Cb is stored in the auxiliary storage device 23 of the image forming apparatus 10, by searching for matching between the received file identification information Cf and stored file identification information.

In this case, the print data Cb is stored in the auxiliary storage device 23. Thus, the image forming apparatus 10 sends the notification for verification to inform about this fact to the client PC 40*b* (P29), and prints out for the document data C using the stored print data Cb. Upon receipt of the aforementioned notification of the verification, the client PC 40*b* terminates processing related to the document data C printing request.

The client PC 40*c* receives from the user the start instruction of the job of printing by the document data D distributed in the form of an attachment to the electronic mail D. Having received the instruction of this printing job, the client PC 40*c* uses its own printer driver to create the file identification information Df for the document data D, and sends a printing request including this file identification information Df to the image forming apparatus 10 (P31).

Upon receipt of the printing request including the file identification information Df from the client PC 40*c*, the image forming apparatus 10 checks whether or not the print data Db is stored in the auxiliary storage device 23 of the image forming apparatus 10, by searching for matching between the received file identification information Df and stored file identification information. In this case, the print data Db is not stored in the auxiliary storage device 23. Thus, the image forming apparatus 10 requests the client PC 40*c* to transmit the PDL data Dp as the PDL data of document data D (P32).

Upon receipt of the request to transmit the PDL data Dp from the image forming apparatus 10, the client PC 40*c* uses the printer driver to develop the document data D into the PDL data Dp, and sends the PDL data Dp to the image forming apparatus 10 (P33).

After receiving the PDL data Dp from the client PC 40*c*, the image forming apparatus 10 develops the PDL data Dp by the image processing section 22 of the image forming apparatus 10, and generates the print data Db as the print data of the document data D. To evaluate the possibility of repeated requests to print out by the document data D, the image forming apparatus 10 sends a storage verification request of the file identification information Df to the mail server 30*b*, and refers the mail server 30*b* to see whether or not the file identification information Df is stored in the file identification information list of the mail server 30*b* (P34).

Upon receipt of the file identification information Df from the image forming apparatus 10, the mail server 30*b* verifies whether or not the file identification information Df is stored in the file identification information list, by checking the file identification information Df (file name and check sum) against the file identification information stored in the server. The mail server 30*b* sends the verification response showing the result of verification to the image forming apparatus 10 (P35).

In this case, the verification response showing the absence in the file identification information list is sent. The image forming apparatus 10 receives this verification response from the mail server 30*b*. When the verification response indicates that the document data D is not stored in the file identification information list of the mail server 30*b*, a step is taken to determine that there will be no repeated document data D printing requests. The file identification information Df and print data Db are not stored in the state associated with each other. After this decision, the image forming apparatus 10 uses the print data Db to print out for the document data D. After receiving the notification that printing for the document data D is carried out in the image forming apparatus 10, the client PC 40*c* terminates the processing related to the document data D printing request.

Figure 10:
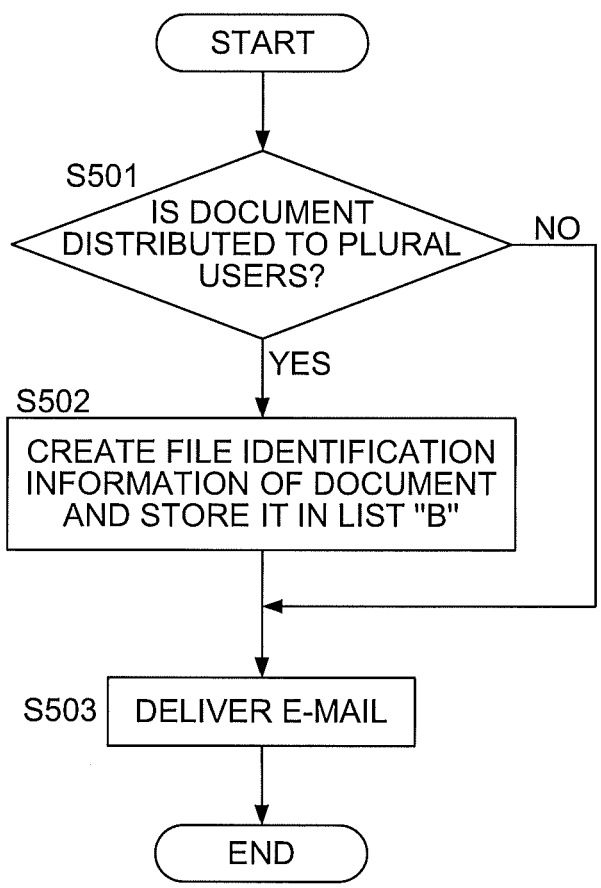
FIG. 10 is a flow diagram representing the operation of the mail server when an electronic mail accompanied by document data is sent in the third embodiment.

FIG. 10 shows the operation of the mail server 30*b* that has been requested to distribute the electronic mail in the third embodiment. Upon receipt of the electronic mail distribution request from the client PC, the mail server 30*b* checks whether or not the destination of the electronic mail includes a plurality of users and whether or not document data is attached as a file (Step S501).

If there is an attached file of document data and the destination includes a plurality of users (Step S501; Yes), the file identification information of the document data is created and is added to the file identification information list B of the same server (Step S502, FIG. 9; P21 and P27). This electronic mail is distributed to each of the addresses (Step S503). Then this processing terminates (END).

If the number of destinations of the electronic mail is only one or the electronic mail does not include any attached file of document data (Step S501; No), the electronic mail received from the client PC is sent to the specified address (Step S503, FIG. 9; P30). Then the present processing terminates (END).

Figure 11:
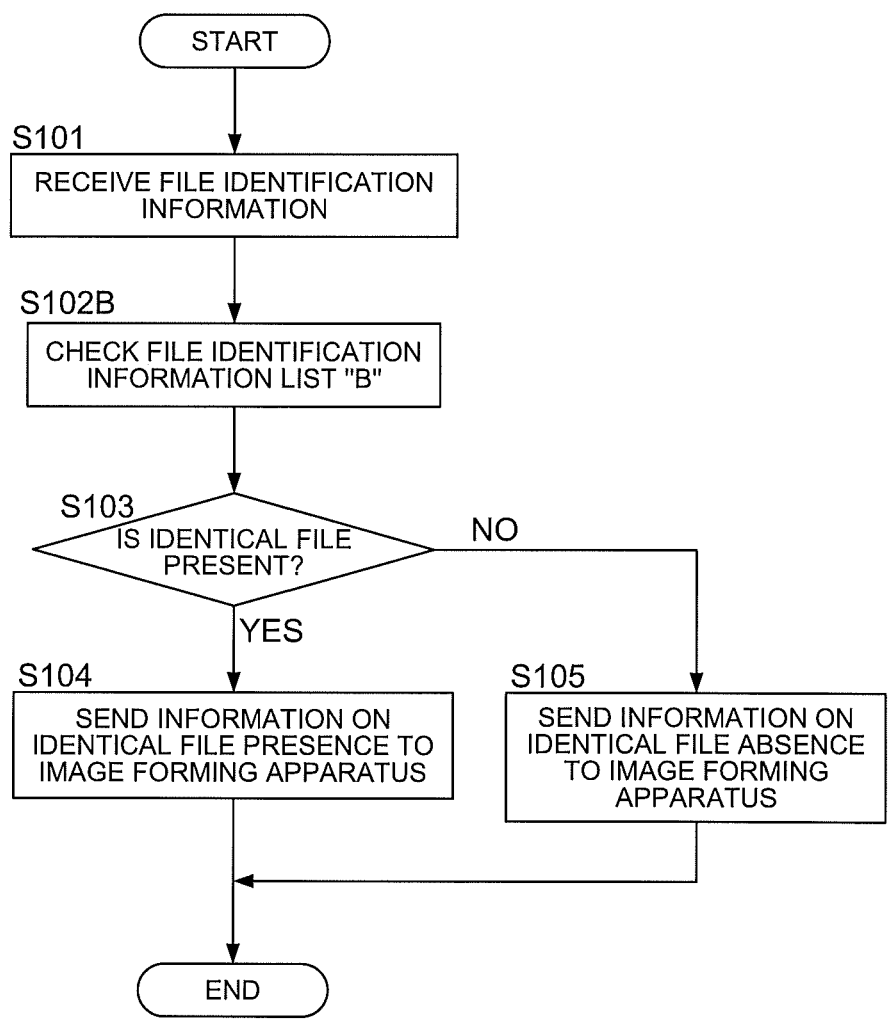
FIG. 11 is a flow diagram representing the operation of the mail server in the third embodiment.

FIG. 11 shows the operation flow when the mail server 30*b* has received file identification information from the image forming apparatus 10 in the third embodiment. The steps of FIG. 11 representing the same processing as that of FIG. 4 are assigned with the same step numbers. The following description with reference to FIG. 11 refers only to the steps that are different from those of FIG. 4.

In FIG. 11, after completion of the Step S101, the Step S102B is performed instead of Step S102 of FIG. 4. In Step S102B, reference is made to the file identification information received by the mail server 30*b* and the file identification information list B based on the distribution record which are stored in its own server, of the electronic mails which are provided with an attached file, and have been distributed to a plurality of users. After completion of the Step S1028, the operation goes to Step S103 and thereafter.

Figure 12:
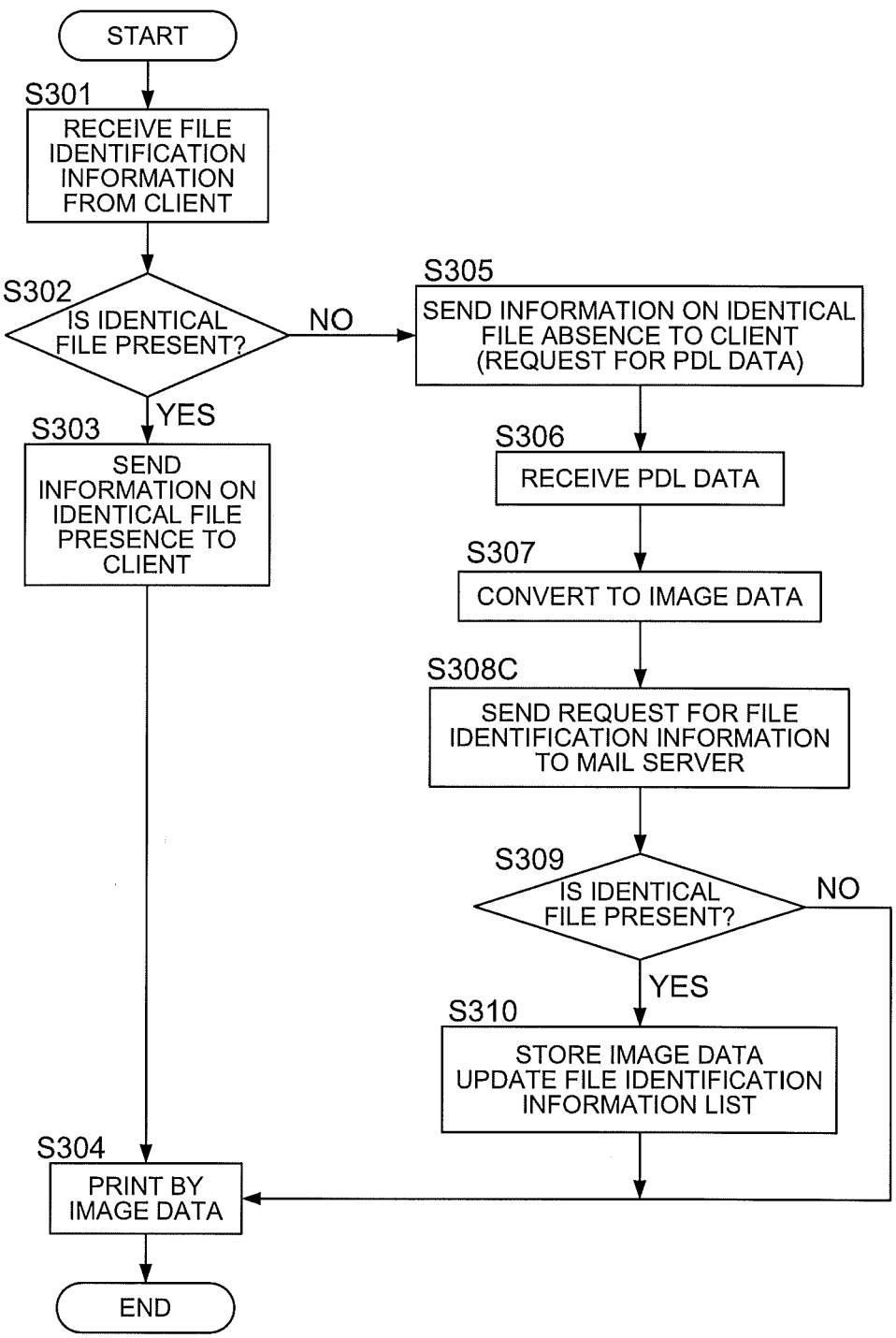
FIG. 12 is a flow diagram representing the operation of an image forming apparatus in the third embodiment.

FIG. 12 shows the operation flow when the image forming apparatus 10 has received a document data printing request from the client PC in the third embodiment. The steps of FIG. 12 representing the same processing as that of FIG. 6 are assigned with the same step numbers. The following description with reference to FIG. 12 refers only to the steps that are different from those of FIG. 6.

In FIG. 12, after completion of the Step S307, Step S308C is first performed instead of Step S308 of FIG. 6. In Step S308C, the image forming apparatus 10 sends to the mail server 30b, the file identification information of the document data the printing of which has been requested. Then the image forming apparatus 10 allows the mail server 30b to check whether or not the document data has been distributed to a plurality of users through the mail server 30b. The image forming apparatus 10 receives the result thereof from the mail server 30b. After completion of Step S308C, the operation goes to Step S309 and thereafter.

As described above, in the third embodiment, the need of storing the generated print data is automatically determined by the image forming apparatus 10, depending on whether or not the document data has been distributed to a plurality of users through the mail server 30b. As compared to the case wherein the requirement for storage is separately specified by each user, this arrangement reduces the user operation in the selection of the targets to be stored, and ensures enhanced user convenience, similarly to the case of the first embodiment. This arrangement also saves the storage capacity for storing the print data in the auxiliary storage device 23. Other advantages are the same as those in the first embodiment, and will not be described to avoid duplication.

The following describes the fourth embodiment.

The configuration in the fourth embodiment is the same as that in the third embodiment, but the method of evaluating the need of storing the print data is similar to the second embodiment (the second evaluation method). The operation of the mail server 30b in the fourth embodiment is the same as that of the file server 30 in the second embodiment (FIG. 7), and will not be described. Further, the items other than the method of checking whether or not the document data has been distributed to a plurality of users, including the device configuration, are the same as those described with reference to the third embodiment, and will not be described to avoid duplication.

Figure 13:
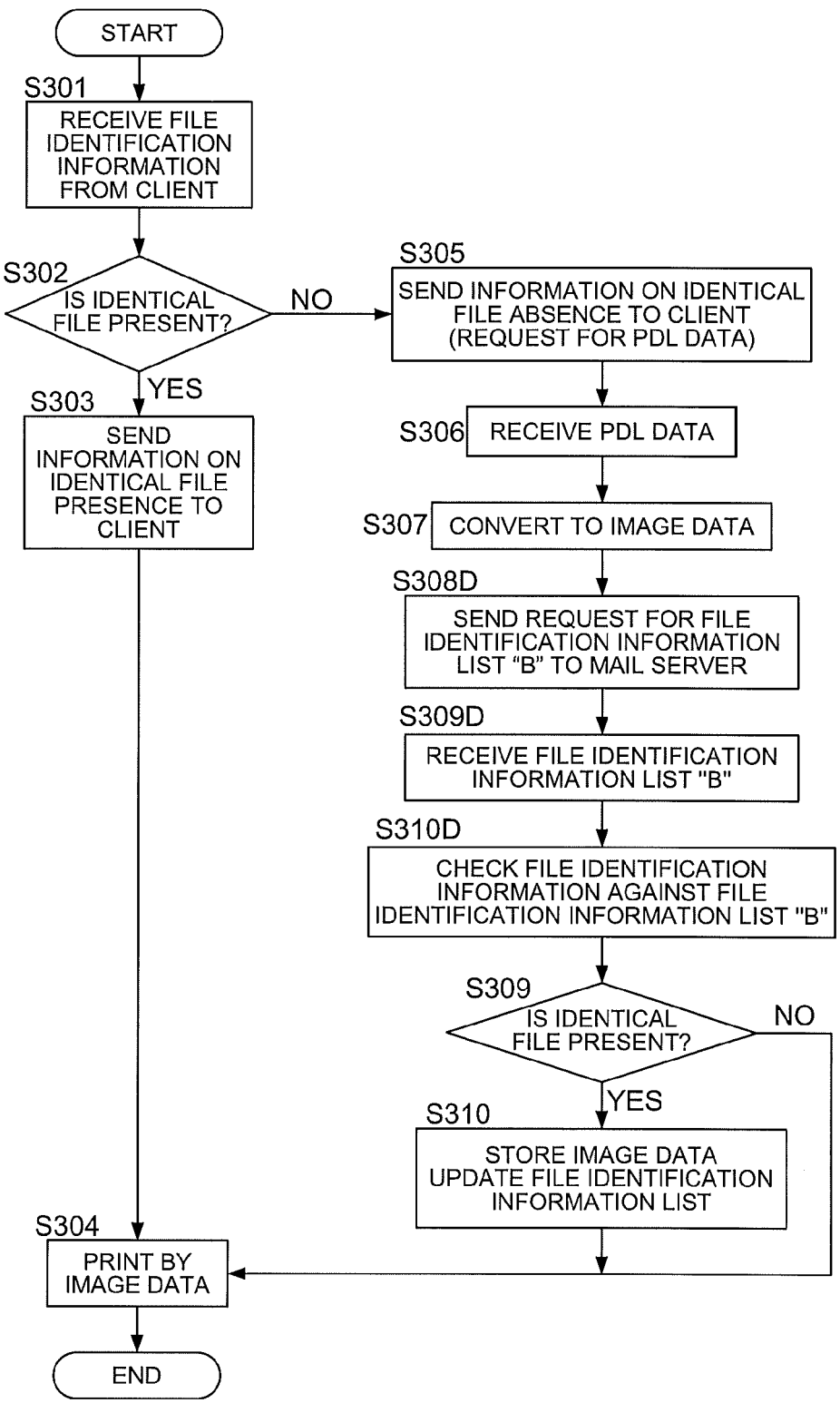
FIG. 13 is a flow diagram representing the operation of an image forming apparatus in the fourth embodiment.

FIG. 13 shows the operation flow when a request to print out by the document data has been received by the image forming apparatus 10 from the client PC in the fourth embodiment. In FIG. 13, the same step numbers as those of FIG. 6 are assigned to the steps performing the same processing as those of FIG. 6. The following describes only the steps of FIG. 13 different from those of FIG. 6.

In FIG. 13, after completion of the Step S307, the Step S308D is performed, instead of Step S308 in FIG. 6. In the Step S308D, the image forming apparatus 10 sends to the mail server 30b, a request to send the file identification information list B stored in the mail server 30b.

Upon receipt of the file identification information list B from the mail server 30b in the ensuing Step S309D, the image forming apparatus 10 checks the file identification information list B received in the Step S310D against the file identification information received from the client PC, and checks whether or not the document data under the printing request has been distributed to a plurality of users through the mail server 30b.

To be more specific, if in the received file identification information list B, the corresponding file identification information to that, received from the client PC is found, the need of storing the print data of this document data is determined. If there is no such information found therein, a step is taken to determine that the print data of this document data need not be stored. After completion of the Step S310D, the operation goes to Step S309 and thereafter.

As described above, in the fourth embodiment, the image forming apparatus 10 acquires the file identification information list B from the mail server 30b, and evaluates the need of storing the print data, based on the file identification information list B. This arrangement reduces the processing load on the side of the mail server 30b. The other advantages are the same as those of the third embodiment and will not be described to avoid duplication.

The following describes the fifth embodiment.

In the fifth embodiment, the printing operation by using the print data stored in the image forming apparatus can be performed from the client PC where the printer driver corresponding to this image forming apparatus is not installed. The operation procedures to the evaluation of the possibility of repeated requests to print out and storing of the print data in the image forming apparatus, are the same as those described with reference to the first through fourth embodiments. These procedures will not be described to avoid duplication.

Figure 14:
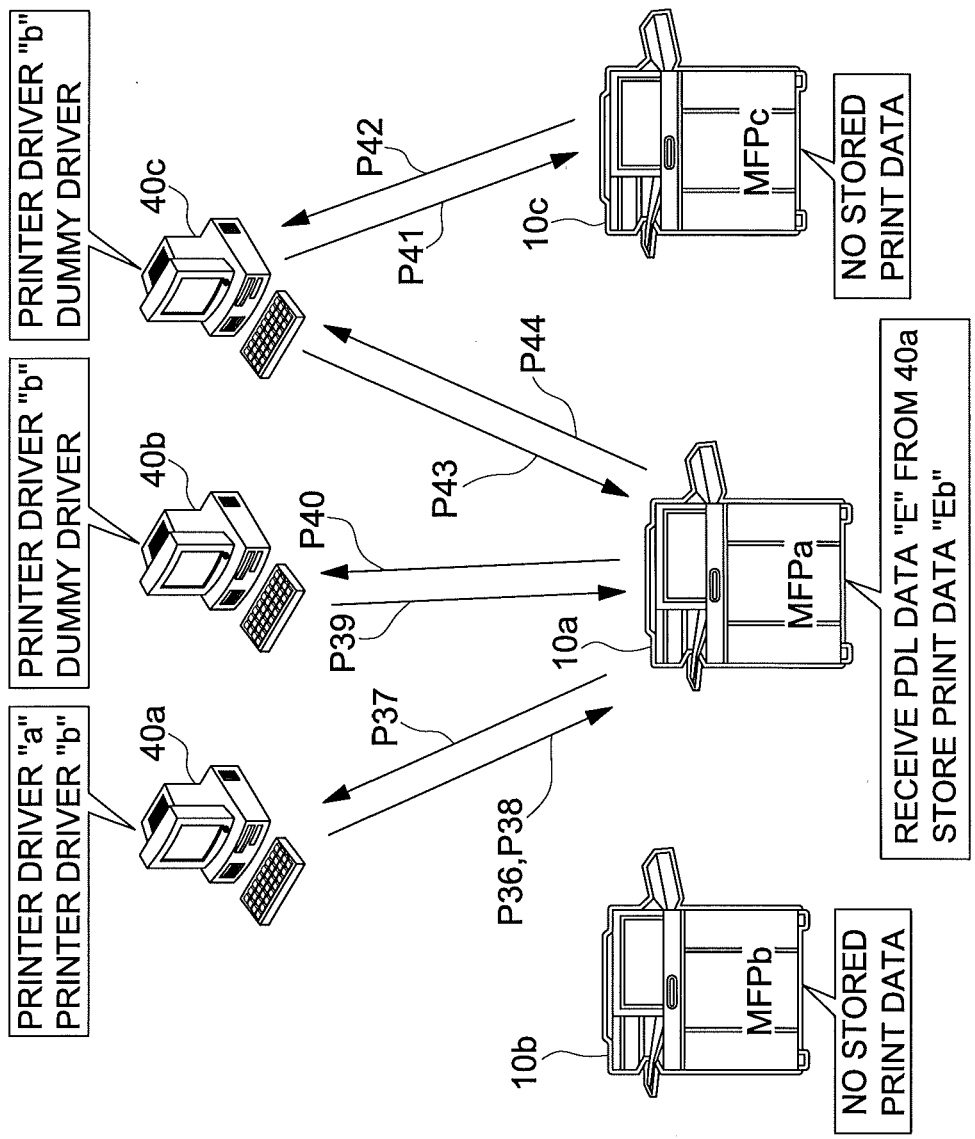
FIG. 14 is an explanatory diagram representing an example of each operation when the document data can be printed out without using a printer driver in the fifth embodiment.

FIG. 14 shows an example of the system configuration and operation sequence relating to the fifth embodiment. The system configuration is basically the same as that shown in FIG. 1. A further characteristic is that the image forming apparatuses 10b and 10c are linked to the network. In FIG. 14, the file server 30 is not illustrated. Here the image forming apparatuses 10a, 10b, and 10c are different types of MFPs, and are respectively provided with a regular printer driver "a", printer driver "b", and printer driver "c" suited to each of them.

Each printer driver is provided with the function of sending to the corresponding image forming apparatus, a printing request including the identification information of document data, when the client PC has received input of the job to print out by the document data. This characteristic is the same as that shown with reference to the first embodiment and others.

The image forming apparatuses 10a and 10c are the MFPs capable of both color printing and monochromatic printing. The image forming apparatus 10b performs only monochromatic printing. In this example, the client PC 40a is provided with both the printer driver "a" and printer driver "b", each of the clients PC 40b and 40c is equipped with the printer driver "b" and dummy driver.

The dummy driver is a printer driver to be installed instead of the regular printer driver in a client PC where a regular printer driver for the image forming apparatus is not installed. The dummy driver is not capable of converting the document data to PDL data.

To the image forming apparatus whose accommodative printer driver has not been installed in the client PC, the dummy driver allows the client PC to send a printing request including the identification information of the document data. This printing request includes the information showing that the sender is a dummy driver.

If the image forming apparatus having received the printing request including the file identification information from the dummy driver includes the print data associated with the file identification information, printing operation is performed using the print data. To be more specific, use of the dummy driver allows a printing request to be sent from a client PC where a regular printer driver is not installed.

For example, the client PC provided only with the monochromatic printer driver allows printing to be performed by the color printer too if the printing request including the file identification information corresponding to the print data is sent from the dummy driver to the color printer currently storing the print data.

In the operation sequence of FIG. 14, the client PC 40a receives from a user the job of printing by the document data E in the image forming apparatus 10*a*. The client PC 40*a* is provided with the regular printer driver "a" of the image forming apparatus 10*a*, and this regular printer driver "a" performs processing related to the printing job.

To be more specific, the printer driver "a" of the client PC 40*a* acquires a document data E from a file server 30 (not illustrated) and generates file identification information Ef corresponding to the document data E. The document data E and printing request including the file identification information Ef is sent to the image forming apparatus 10*a* (P36).

In this case, it is assumed that the image forming apparatus 10*a* does not include the print data corresponding to the document data E. Thus, the image forming apparatus 10*a* sends the PDL data Ep transmission request to the client PC 40*a* (P37), similarly to P4 and P5 of FIG. 3.

In conformity to the above, the client PC 40*a* creates the PDL data Ep and sends it to the image forming apparatus 10*a* (P38). The image forming apparatus 10*a* generates the print data Eb based on the received PDL data Ep, and starts printing. At the same time, the image forming apparatus 10*a* stores the print data Eb in the form associated with the file identification information Ef.

After that, the client PC 40*b* receives from a user the job of printing by the document data E in the image forming apparatus 10*a*. Since the client PC 40*b* is not provided with a regular printer driver "a" of the image forming apparatus 10*a*, the dummy driver takes charge of the processing related to the printing job.

The dummy driver of the client PC 40*b* acquires the document data E from the file server 30 (not illustrated) and creates the file identification information Ef. The dummy driver sends to the image forming apparatus 10*a*, the printing request including this file identification information Ef and the information showing that the dummy driver is the sender of this transmission (P39).

Upon receipt of the printing request from the client PC 40*b*, the image forming apparatus 10*a*, because of having the print data already stored in its own auxiliary storage device 23, sends the information on this fact to the client PC 40*b* (P40), and uses the print data Eb to start printing. The client PC 40*b* having received the confirmation notice terminates the processing related to the document data E printing request.

Further, the client PC 40*c* accepts from the user the job of printing by the document data E in the image forming apparatus 10*c* whose regular printer driver is not provided in the client PC 40*c*. Since the client PC 40*c* is not equipped with the regular printer driver of the image forming apparatus 10*c*, the dummy driver takes charge of processing related to this printing job.

The dummy driver of the client PC 40*c* acquires the document data E from the file server 30 (not illustrated) and creates the file identification information Ef. The dummy driver sends to the image forming apparatus 10*c*, the printing request including this file identification information Ef and the information showing that the dummy driver is the sender of this transmission (P41).

In this case, it is assumed that the image forming apparatus 10*c* does not include the print data Eb corresponding to the file identification information Ef. Since the sender of the printing request is a dummy driver, the image forming apparatus 10*c* sends to the client PC 40*c* a confirmation notice showing that the printing is disabled, without issuing a PDL data transmission request (P42).

Upon receipt of the confirmation notice showing that the printing is disabled, the client PC 40*c* sends the aforementioned printing request to another image forming apparatus linked via the network to try a printing operation on that image forming apparatus. In this example, the printing request including the file identification information Ef is sent to the image forming apparatus 10*a* (P43).

The image forming apparatus 10*a* stores the print data Eb associated with the file identification information Ef. The image forming apparatus 10*a* sends back to the client PC 40*c* the confirmation notice showing that the print data Eb is stored (P44) and uses the print data Eb to start the printing operation. The dummy driver of the client PC 40*c* having received the confirmation notice terminates the processing related to the document data E printing request.

FIG. 15 shows the operation flow of the client PC in the fifth embodiment. In this case, it is assumed that the client PC is equipped with a dummy driver, but not with a regular printer driver of the image forming apparatus specified as the destination of printing. In FIG. 15, the same step numbers as those of FIG. 5 are assigned to the steps performing the same processing as those of FIG. 5.

Having received a printing job from the user (Step S201), the client PC drives the dummy driver. The dummy driver creates the file identification information of the document data specified to be printed in the printing job. The printing request including the dummy driver information showing that the source of sending the printing request is a dummy driver and the created file identification information is sent to the image forming apparatus where the printing operation is to be performed (Step S203B, FIG. 14; P39 and P41).

When having received the confirmation notice showing the presence of print data corresponding to the file identification information from the image forming apparatus as a destination of sending the printing request (Step S204; Yes, FIG. 14; P40), the client PC notifies the user by showing on the display of this client PC and others the identification information (e.g., name and device ID) of the image forming apparatus where printing is performed (Step S205). Then processing terminates (END). In this case, the image forming apparatus where the printing is to be performed starts the printing operation in response to the printing request sent from the client PC, using the print data stored in the image forming apparatus.

When the client PC has received a confirmation notice showing the absence of the print data corresponding to the file identification information from the image forming apparatus as a destination of sending the printing request (Step S204; No, FIG. 14; P42), search is conducted to find out an unconfirmed image forming apparatus to which a printing request has not yet been sent (Step S204B, FIG. 14; P43). If an unconfirmed image forming apparatus has been found (Step S204B; Yes, FIG. 14; P44), the operation goes back to Step S203B, and a printing request is sent to the unconfirmed image forming apparatus. If there is no unconfirmed image forming apparatus (Step S204B; No), the client PC notifies the user that the document data printing job is disabled (Step S206B). Then the present processing terminates (END).

As described above, in the fifth embodiment, the client PC not provided with a regular printer driver allows the document data printing operation to be performed by the image forming apparatus, by reusing the print data stored in the image forming apparatus.

Upon receipt of a confirmation notice showing that the printing operation is disabled, the printing request is sent to another image forming apparatus on the network. Thus, even when the print data is stored in an image forming apparatus different from the one designated to perform the printing operation, the printing operation using that print data can be performed. Further, the user is relieved of the load of finding an image forming apparatus storing the print data, with the result that user convenience is enhanced.

In the above description, the need of storing the print data is automatically evaluated by the image forming apparatus. It is also possible to make such arrangements that the need of storing the print data is selected by the regular printer driver of the image forming apparatus.

As described above, the dummy driver can execute the printing operation only by using the print data stored in the MFP. Thus, only the document data of the print data stored in the image forming apparatus by the user of the client PC provided with a regular printer driver (capable of developing the document data into the PDL data and sending the PDL data to the image forming apparatus) is the document data that allows printing to be performed by the dummy driver. Thus, if the need of storing the print data can be selected by the regular printer driver of the image forming apparatus, the user of the client PC provided with a regular printer driver is allowed to configure a system wherein a desired restriction can be imposed on the document data that can be printed, from the client PC equipped only with a dummy driver.

Although the embodiments of the present invention have been described by way of the accompanying drawings, it is to be noted that specific structures are not restricted to those shown in the embodiments. Various changes and modifications should be construed as being contained in the present invention unless such changes and modifications depart from the scope of the present invention.

For example, in the embodiments, the retainment period when the print data is stored is not set in the image forming apparatus. It is also possible to make such arrangements that the user sets a desired retainment period when the print data is stored.

In the embodiment, the print data is stored in the form associated with the file identification information in the image forming apparatus 10. Instead of this arrangement, it is also possible to make such arrangements that the file identification information and PDL data are associated with each other and are stored. In this case, the image forming apparatus 10 can be so structure that, upon receipt of the printing request including the same file identification information as the PDL stored in its own device, the PDL data is developed to generate the print data, and printing operation is performed using this print data.

Further, in the aforementioned embodiments, the client PC creates file identification information when the client PC issues a printing request. It is also possible to adopt such a structure that file identification information is created only on the server side and, when the client PC acquires the document data from the server, the file identification information of this document data is also acquired by the client PC for use.

In this case, the file server side can be arranged in such a way that the file identification information of only the file stored in the shared directory is notified to the client PC. While even for the file stored in the non-shared directory, the file identification information also may be created and notified to the client PC. In the former case, for example, when the file identification information has been returned from the file server; the client PC sends the printing request including the file identification information to the image forming apparatus 10. If there is no return signal, PDL data is created from the document data and the printing request including the PDL data is sent to the image forming apparatus 10. When receiving the printing request including the file identification information, the image forming apparatus 10 operates as in the first embodiment. When the file identification information is not included, the print data is created from the received PDL data, and the printing operation is performed without this print data being stored.

It is also possible to arrange such a configuration that the printing request including the pass information (e.g., IP address and directory information) as the file identification information can be sent from the client PC. In this case, the pass of a specific storage unit is set in the image forming apparatus 10 in advance. If matching is found between the set pass and the pass of the file identification information received from the client PC, the image forming apparatus 10 determines the need of storing the print data of the document data for which printing request has been received, and stores that print data, accordingly.

Further, in the embodiments, the file identification information is sent from the client PC to the image forming apparatus 10 as a document data printing request. It is also possible to send the file identification information as an evaluation instruction for evaluating the document data, without the printing operation to be performed. To put it in more detail, an evaluation instruction including the file identification information is sent to the image forming apparatus 10 from the client PC. Upon receipt of this instruction, the image forming apparatus 10 evaluates the possibility that the document data corresponding to the file identification information will receive repeated printing requests, without the printing operation to be performed. Then the result of evaluation is notified to the client PC.

This is followed by a further arrangement wherein, when having been notified of the evaluation result of receiving repeated printing requests, the client PC sends the PDL data to the image forming apparatus 10 so that the print data is developed, and the print data is associated with the file identification information and is only stored in the image forming apparatus 10, without the printing operation being performed. The stored print data is used when the image forming apparatus 10 has received a request to print out by the document data.

Further, the image forming apparatus 10 sends a PDL data request to the client PC. The time of receiving the PDL data from the client PC is not restricted to the example of FIG. 6. For example, in FIG. 6, when the print data matching the file identification information is not stored in the image forming apparatus 10, the image forming apparatus 10 sends a request for the PDL data to the client PC and gets the PDL data. After that, the need of storing the print data corresponding to this PDL data is evaluated. By contrast, it is also possible to arrange such a configuration that the image forming apparatus 10 evaluates the need of storing the print data of the document data, the printing of which has been requested by the client PC. After that, a request may be sent to the client PC to send the PDL data.

The time of developing the PDL data to the print data by the image forming apparatus 10 and the time of sending a storage verification request to the file server can be different from that shown in FIG. 6. For example, the image forming apparatus 10 develops the PDL data received from the client PC into the print data, and then sends the storage verification request to the file server. However, these two operations can be performed in the opposite order.

It is also possible to adopt such a structure that the print data currently stored in the image forming apparatus 10 can be checked. For example, the print data can be made to be checked from each client PC via the network 2, or from the display section 20 of the image forming apparatus 10.

It is also possible to arrange such a configuration that the image forming apparatus 10 communicates with the file server on a periodic basis. If the document data of the print data which has been determined to be stored is deleted or removed from a predetermined position such as the shared directory, the print data can be deleted from the image forming apparatus 10.

The method of evaluating the need of storing the print data can be designed in such a way as to evaluate the possibility of repeated requests to print out by the document data, by referring to a schedule management server registering the conference name, place, time, participant name, and document data distributed at the conference or the notification of opening the conference (e.g., electronic mail). For example, if the document data whose printing has been requested is a conference document and the number of printed copies this time is smaller than the number of the participants in the conference, a step may be taken to determine that there is a possibility of receiving printing request for this document data. The need of storing the print data generated from the document data is determined so that the print data is stored in the image forming apparatus.

The following method can be used to evaluate the need of storing the print data. The file identification information of the document data printed for the first time is stored in the image forming apparatus 10 (without the print data being stored). After that, upon receipt of the printing request including the same file identification information as that of the first time (second reception), this document data is determined that a repeated printing request of this will be received. The print data having been developed this time is associated with the file identification information and is stored. If the printing request including the same file identification information as that of the first time has been received for the third time or thereafter (i.e., when the print data associated with the file identification information is stored), the stored print data is used for printing.

The following method can also be used to evaluate the need of storing the print data. If there is a printing request for the same document data prior to termination of the document data printing (in the standby mode in the job queue or during printing) in the image forming apparatus having accepted execution of the printing job, that document data is evaluated so that it will receive repeated printing requests. The need of storing the print data obtained by development of the document data is determined and this print data is stored.

When the possibility of receiving repeated printing requests is evaluated according to the criteria such as the presence in the shared directory or the distribution to a plurality of users, the expression "receive repeated printing requests" can be replaced by the expression "receive printing requests from a plurality of users".

In this embodiment, an MFP is used as an example of the image forming apparatus 10. Any output device (e.g., printer) can be used if linkage of the device with an external terminal capable of sending a printing job can be achieved via the network, and if the developed print data can be stored by the device. Another device not equipped with a scanner function or facsimile function can also be used.

According to the image forming apparatus relating to embodiments of the present invention, the possibility of repeated requests to print out by the document data is evaluated and the need of storing the print data related to the document data is determined. When there is need of storing, the print data is stored so as to be capable of being reused. This arrangement reduces the storage space as compared to the case of storing all the print data unselectively. Further, the need of storage is automatically determined. As compared to the case where the need of storage is separately determined by each user, this arrangement ensures enhanced user convenience. Further, reuse of the stored print data reduces the printing time.

What is claimed is:

1. An image forming apparatus comprising:
   a development section which develops received document data into print data;
   a storage section;
   a printing section; and
   a control section which determines whether or not it is necessary to store the print data obtained by allowing the development section to develop the document data, by determining a possibility of repeated request for printing for the document data, and which allows the storage section to store the print data therein if the storage of the print data is determined to be necessary, and further which allows the printing section to perform printing related to the printing request using the print data when receiving the printing request of the document data, if the storage section stores the print data corresponding to the document data.

2. The image forming apparatus of claim 1,
   wherein the control section determines the possibility based on whether or not the document data is stored in a predetermined storage device in which the document data can be accessed by a plurality of users, and the control section determines it is necessary to store the print data of the document data if the document data is stored in the storage device.

3. The image forming apparatus of claim 1,
   wherein the control section determines the possibility based on whether or not the document data has been distributed to a plurality of users, and the control section determines it is necessary to store the print data of the document data if the document data has been distributed to the plurality of users.

4. The image forming apparatus of claim 3,
   wherein the document data is distributed to the plurality of users by sending an electronic mail including the document data attached thereto, from a mail server to the plurality of users, and the control section accesses the mail server to detect whether or not the document data has been sent to the plurality of users.

5. The image forming apparatus of claim 1,
   wherein the control section associates the print data having been determined to need to be stored, with an identification information of the document data which has been developed into the print data, and allows the storage section to store the associated print data therein, and when the control section receives the printing request including the identification information of the document data, the control section checks whether or not the print data corresponding to the document data is stored in the storage section, by checking whether or not the print data associated with same identification information as the identification information included in the printing request is stored in the storage section.

6. The image forming apparatus of claim 1,
   wherein the control section determines the possibility for the document data which has been received together with the printing request.

7. An image forming method for use in an image forming apparatus having a storage section and a printing section, the method comprising:
   developing received document data into print data;
   determining whether or not it is necessary to store the print data obtained by allowing the document data to be developed, by determining a possibility of repeated request for printing for the document data;

allowing the storage section to store the print data therein if the storage of the print data is determined to be necessary; and allowing the printing section to perform printing related to the printing request using the print data when receiving the printing request of the document data, if the storage section stores the print data corresponding to the document data.

8. The image forming method of claim 7, wherein the possibility is determined based on whether or not the document data is stored in a predetermined storage device in which the document data can be accessed by a plurality of users, and it is determined to be necessary to store the print data of the document data if the document data is stored in the storage device.

9. The image forming method of claim 7, wherein the possibility is determined based on whether or not the document data has been distributed to a plurality of users, and it is determined to be necessary to store the print data of the document data if the document data has been distributed to the plurality of users.

10. The image forming method of claim 9, wherein the document data is distributed to the plurality of users by sending an electronic mail including the document data attached thereto, from a mail server to the plurality of users, and the mail server is accessed to detect whether or not the document data has been sent to the plurality of users.

11. The image forming method of claim 7, wherein the print data having been determined to need to be stored is associated with an identification information of the document data which has been developed into the print data and the storage section is allowed to store the associated print data therein, and when the printing request including the identification information of the document data is received, it is checked whether or not the print data corresponding to the document data is stored in the storage section, by checking whether or not the print data associated with same identification information as the identification information included in the printing request is stored in the storage section.

12. The image forming method of claim 7, wherein the possibility is determined for the document data which has been received together with the printing request.

\* \* \* \* \*